(12) United States Patent
Wexler et al.

(10) Patent No.: US 11,493,959 B2
(45) Date of Patent: Nov. 8, 2022

(54) WEARABLE APPARATUS AND METHODS FOR PROVIDING TRANSCRIPTION AND/OR SUMMARY

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: ORCAM TECHNOLOGIES LTD., Jerusalem (IL)

(*) Notice: Subject to any disclaimer, the term of this patent is extended or adjusted under 35 U.S.C. 154(b) by 0 days.

(21) Appl. No.: 17/444,942

(22) Filed: Aug. 12, 2021

(65) Prior Publication Data

US 2022/0050498 A1 Feb. 17, 2022

Related U.S. Application Data

(60) Provisional application No. 63/066,343, filed on Aug. 17, 2020.

(51) Int. Cl.
| | |
|---|---|
| *G06F 1/16* | (2006.01) |
| *G10L 15/26* | (2006.01) |
| *G06K 19/06* | (2006.01) |
| *G06F 21/32* | (2013.01) |
| *G06V 40/16* | (2022.01) |

(52) U.S. Cl.
CPC ............ *G06F 1/163* (2013.01); *G06F 1/1686* (2013.01); *G06F 21/32* (2013.01); *G06K 19/06009* (2013.01); *G06V 40/172* (2022.01); *G10L 15/26* (2013.01)

(58) Field of Classification Search
CPC ........ G06F 1/163; G06F 1/1686; G06F 21/32; G06F 21/36; G06K 19/06009; G06V 40/172; G06V 10/454; G06V 10/462; G06V 10/82; G10L 15/26; G10L 17/08
See application file for complete search history.

(56) References Cited

U.S. PATENT DOCUMENTS

| | | | |
|---|---|---|---|
| 2014/0006026 A1* | 1/2014 | Lamb | ...................... G10L 17/00 704/E17.001 |
| 2014/0071288 A1* | 3/2014 | Kim | ................... H04N 5/23206 348/158 |
| 2014/0118631 A1* | 5/2014 | Cho | ................. H04N 21/41265 348/836 |

(Continued)

*Primary Examiner* — Abhishek Sarma
(74) *Attorney, Agent, or Firm* — Finnegan, Henderson, Farabow, Garrett & Dunner LLP

(57) ABSTRACT

System and methods for processing audio signals are disclosed. In one implementation, a system may include a wearable apparatus including an image sensor to capture images from an environment of a user; an audio sensor to capture an audio signal from the environment of the user; and at least one processor. The processor may be programmed to receive the audio signal captured by the audio sensor; identify at least one segment including speech in the audio signal; receive an image including a representation of a code; analyze the code to determine whether the code is associated with the user and/or the wearable apparatus; and after determining that the code is associated with the user and/or the wearable apparatus, transmit at least one segment of the audio signal, at least one image of the plurality of images, and/or other information to a computing platform.

22 Claims, 42 Drawing Sheets

(56) References Cited

U.S. PATENT DOCUMENTS

| | | | |
|---|---|---|---|
| 2015/0016644 A1* | 1/2015 | Strelcyk | H04R 25/405 |
| | | | 381/314 |
| 2017/0230760 A1* | 8/2017 | Sanger | H04R 1/028 |
| 2018/0048800 A1* | 2/2018 | Wexler | G06F 3/012 |
| 2020/0296521 A1* | 9/2020 | Wexler | H04N 5/2252 |

* cited by examiner

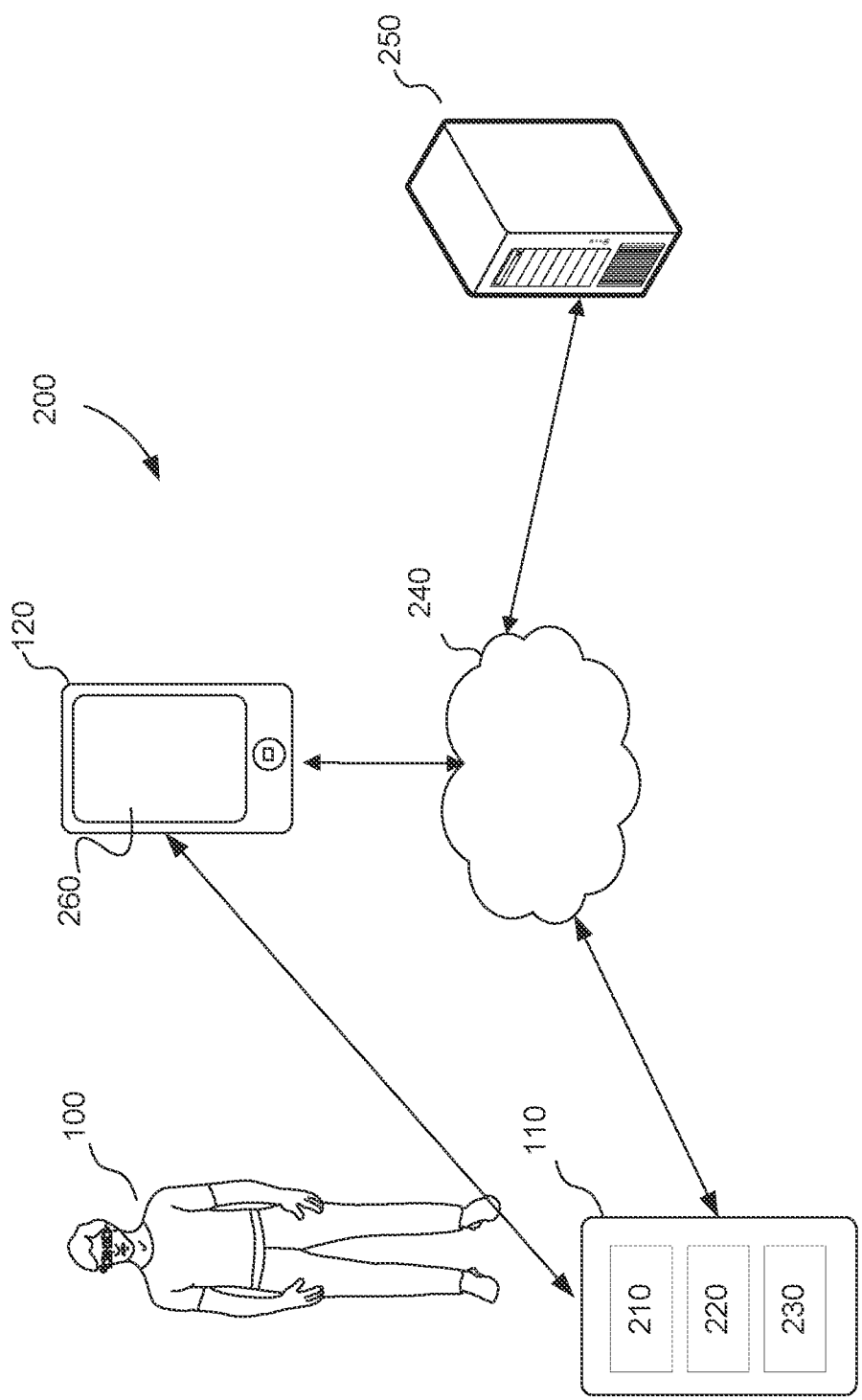

F-View

R-View

S-View

T-View

B-View

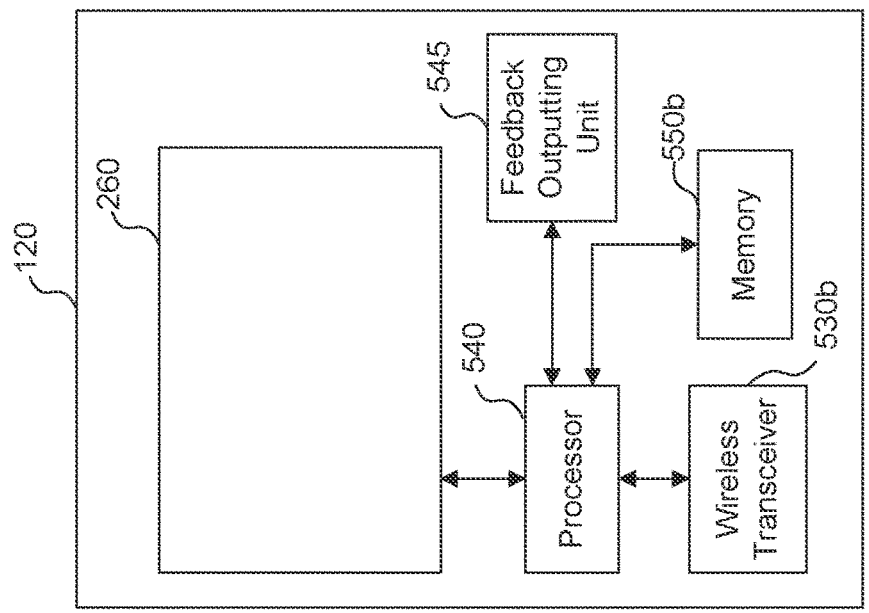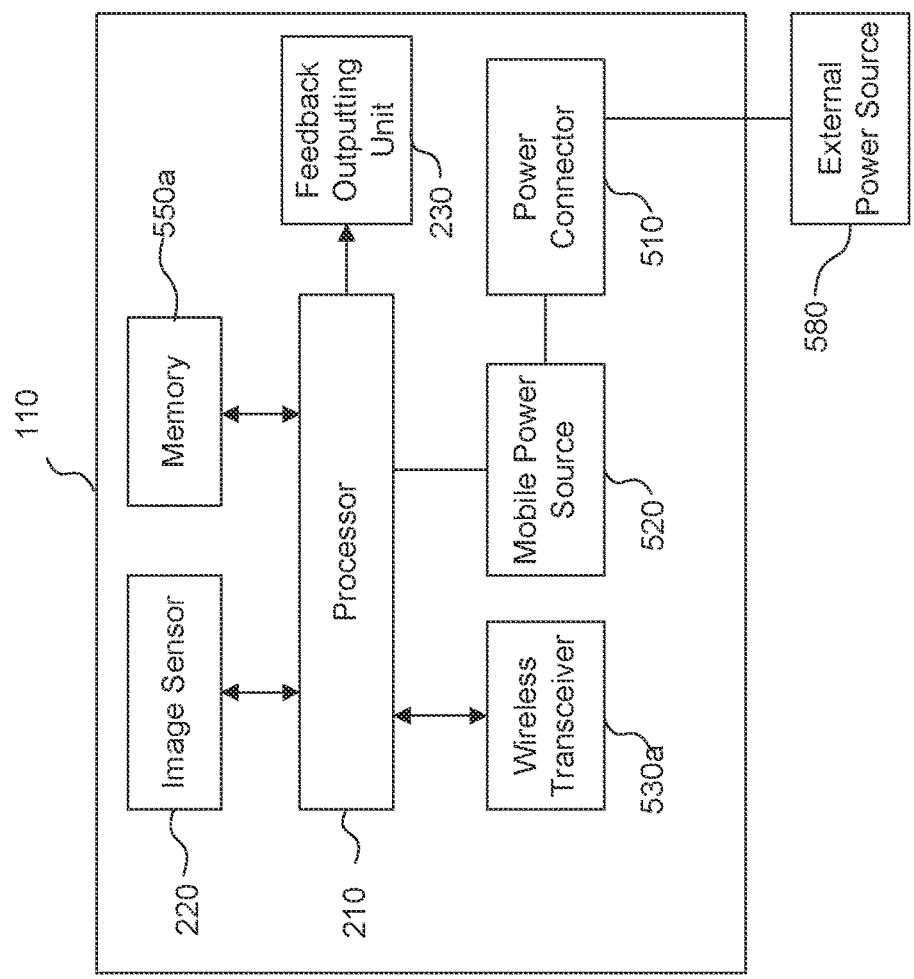
Fig. 5C

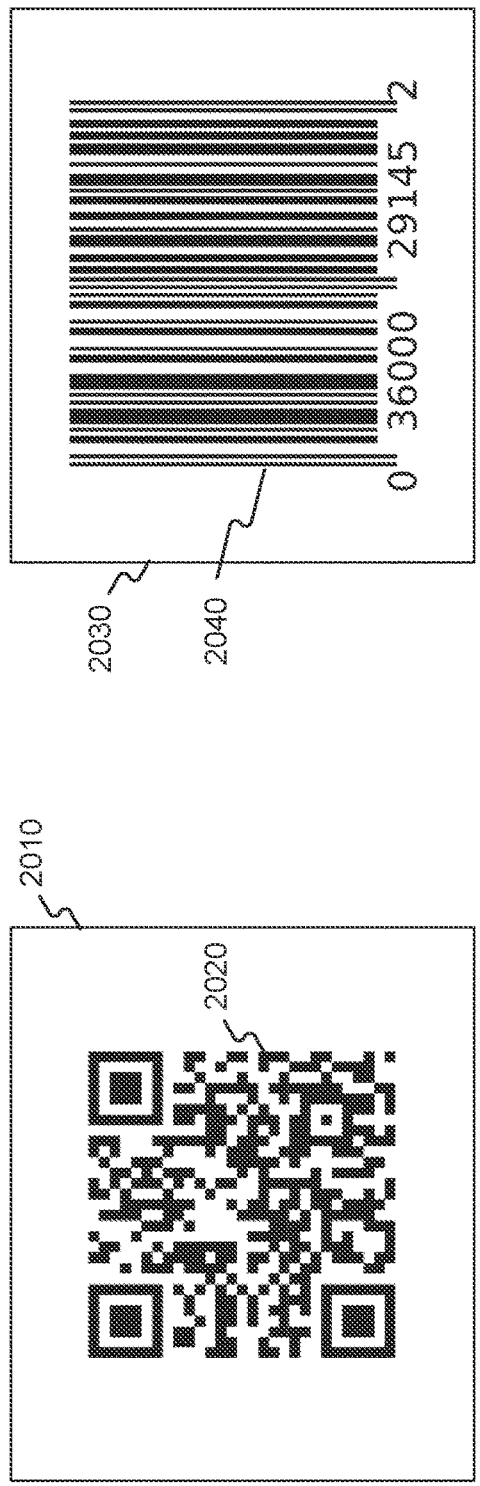
FIG. 20A
FIG. 20B
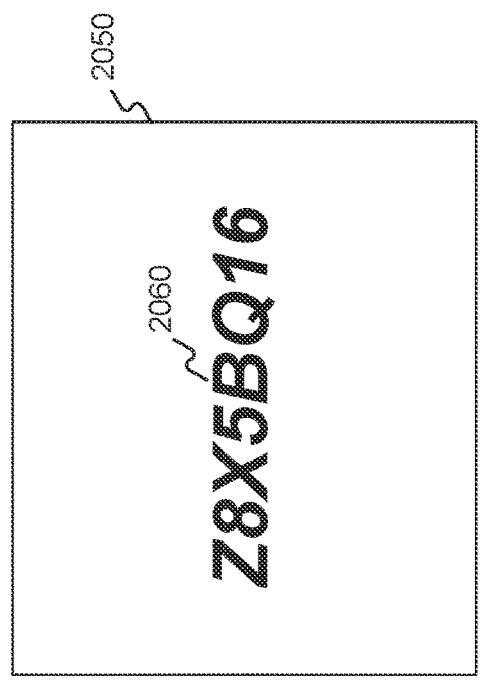
FIG. 20C

WEARABLE APPARATUS AND METHODS FOR PROVIDING TRANSCRIPTION AND/OR SUMMARY

CROSS REFERENCE TO RELATED APPLICATION

This application claims the benefit of priority of U.S. Provisional Patent Application No. 63/066,343, filed on Aug. 17, 2020, the contents of which are incorporated herein by reference in their entirety.

BACKGROUND

Technical Field

This disclosure generally relates to devices and methods for capturing and processing images and audio from an environment of a user, and using information derived from captured images and audio.

Background Information

Today, technological advancements make it possible for wearable devices to automatically capture images and audio, and store information that is associated with the captured images and audio. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image and audio data.

Even though users can capture images and audio with their smartphones and some smartphone applications can process the captured information, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities. Therefore, there is a need for apparatuses and methods for automatically capturing and processing images and audio to provide useful information to users of the apparatuses, and for systems and methods to process and leverage information gathered by the apparatuses.

SUMMARY

Embodiments consistent with the present disclosure provide devices and methods for automatically capturing and processing images and audio from an environment of a user, and systems and methods for processing information related to images and audio captured from the environment of the user.

In an embodiment, a wearable apparatus may comprise an image sensor configured to capture a plurality of images from an environment of a user of the wearable apparatus; an audio sensor configured to capture an audio signal from the environment of the user; and at least one processor. The at least one processor may be programmed to receive the audio signal captured by the audio sensor; identify at least one segment of the audio signal, the at least one segment comprising speech; receive an image captured by the image sensor, the image including a representation of a code; analyze the code to determine whether the code is associated with at least one of the user or the wearable apparatus; and after determining that the code is associated with the user or the wearable apparatus, transmit at least one of the at least one segment of the audio signal, at least one image of the plurality of images, or other information to a computing platform.

In another embodiment, a system for processing audio signals comprises an image sensor configured to capture a plurality of images from an environment of a user; an audio sensor configured to capture an audio signal from the environment of the user; a first processor; and a second processor. The first processor may be programmed to receive the audio signal captured by the audio sensor; identify at least one segment of the audio signal, the at least one segment comprising speech; receive an image captured by the image sensor, the image including a representation of a code; analyze the code to determine whether the code is associated with at least one of the user or a device associated with the first processor; and after determining that the code is associated with the user or the device associated with the first processor, transmit at least one of a transcription of the at least one segment of the audio signal, at least one image of the plurality of images, or other information to a computing platform. The second processor may be programmed to display the image representing the code on a display device, wherein the display device is located in the environment of the user.

In another embodiment, a method for processing audio signals is disclosed. The method may comprise receiving at least one audio signal representative of the sounds captured by an audio sensor from an environment of a user; identifying at least one segment of the audio signal, the at least one segment comprising speech; receiving an image captured by the image sensor, the image including a representation of a code; analyzing the code to determine whether the code is associated with at least one of the user or a wearable apparatus associated with the user; and after determining that the code is associated with the user or the wearable apparatus, transmitting at least one of a transcription of the at least one segment of the audio signal, at least one of the plurality of images, or other information to a computing platform.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is a schematic illustration of an example system consistent with the disclosed embodiments.

FIG. 5C is a block diagram illustrating an example of the components of a wearable apparatus according to a third embodiment.

FIG. 20A illustrates an exemplary embodiment of an image including a representation of a code consistent with the present disclosure.

FIG. 20B illustrates another exemplary embodiment of an image including a representation of a code consistent with the present disclosure.

FIG. 20C illustrates another exemplary embodiment of an image including a representation of a code consistent with the present disclosure.

DETAILED DESCRIPTION

Figure 1A:
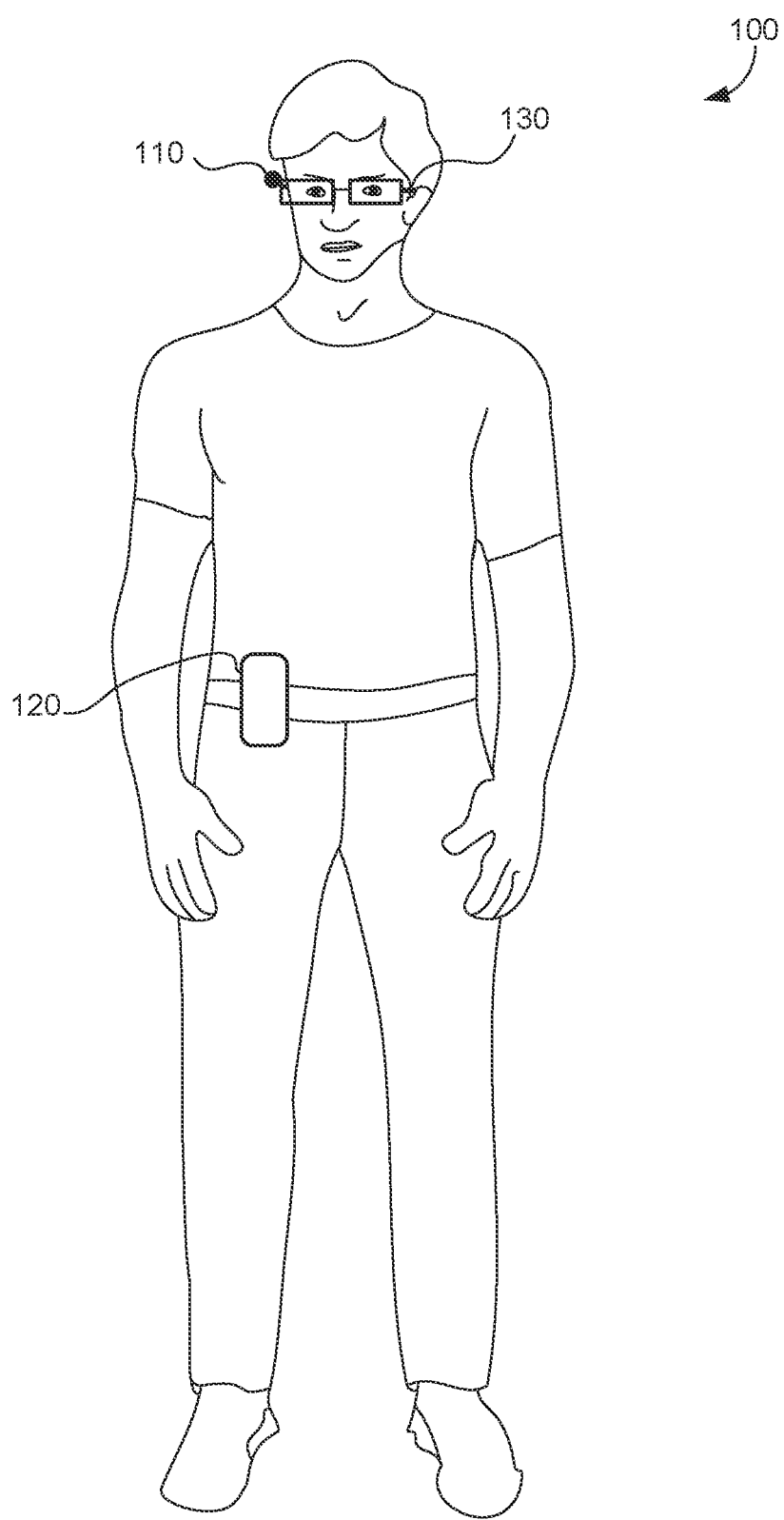
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
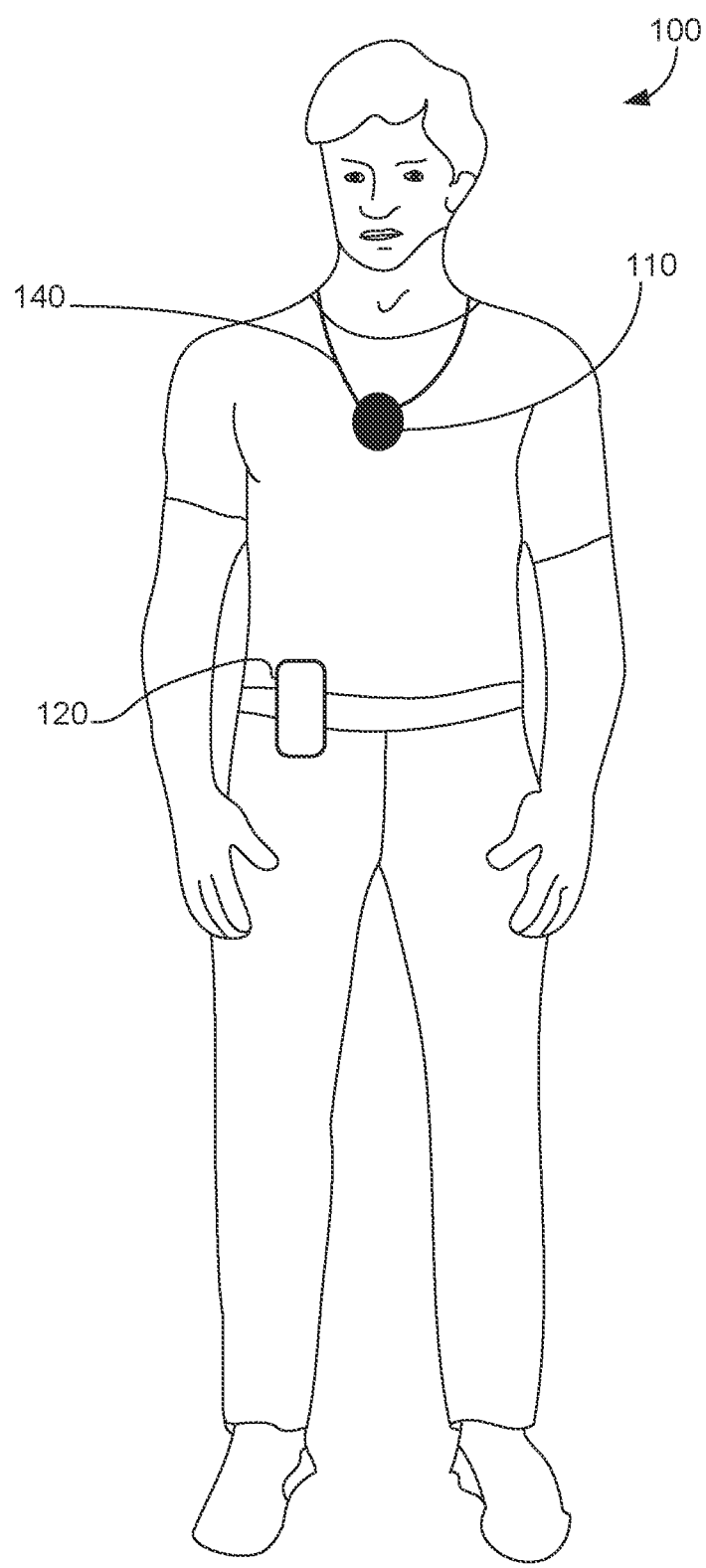
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
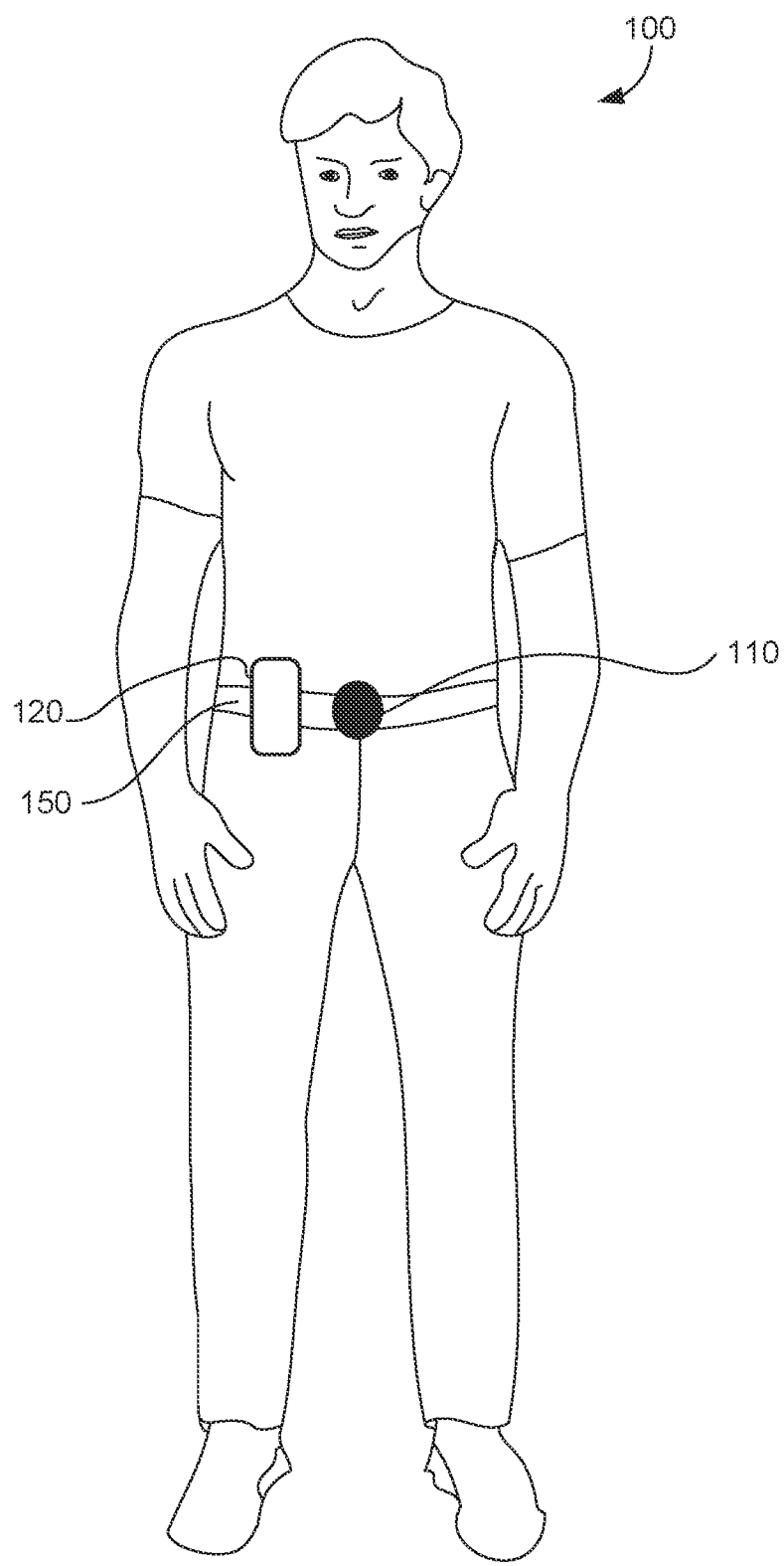
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
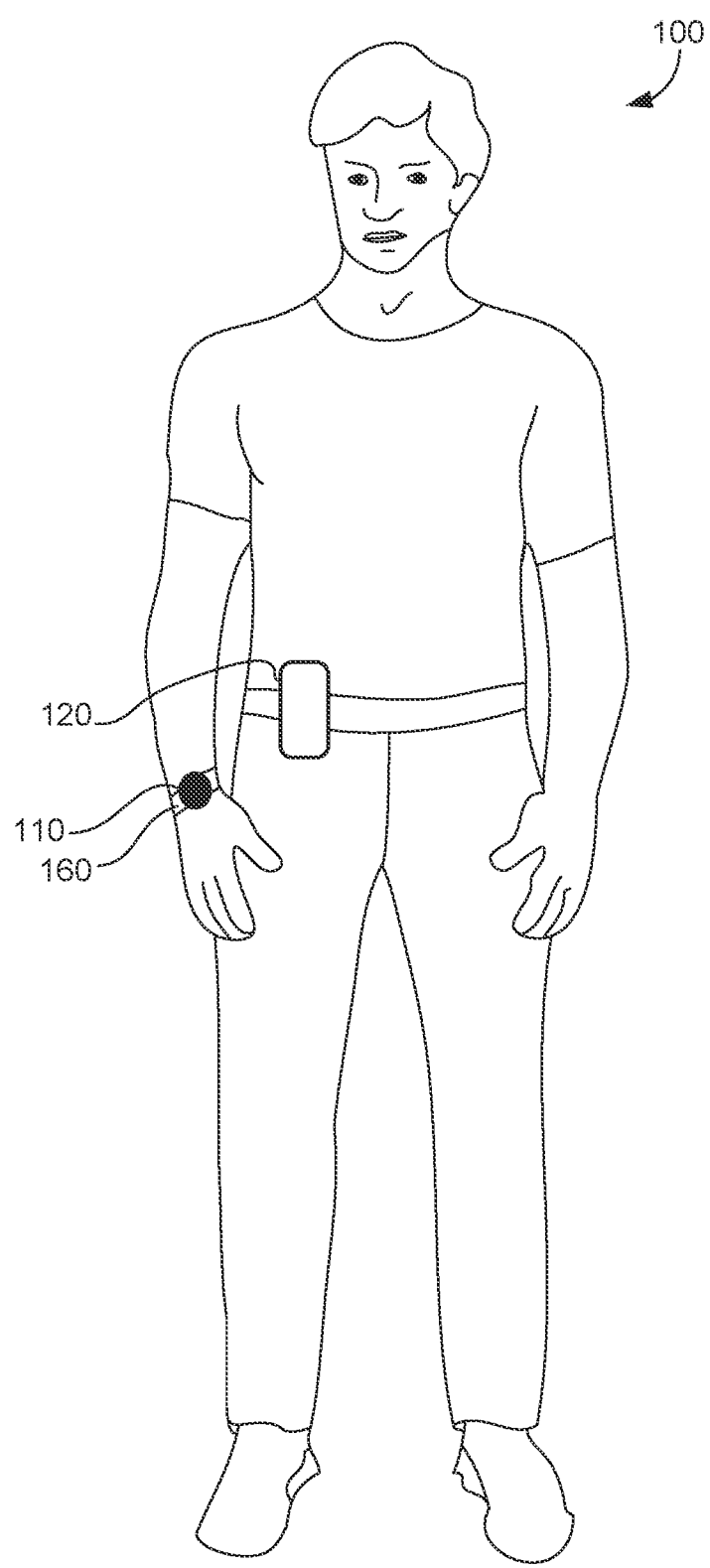
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
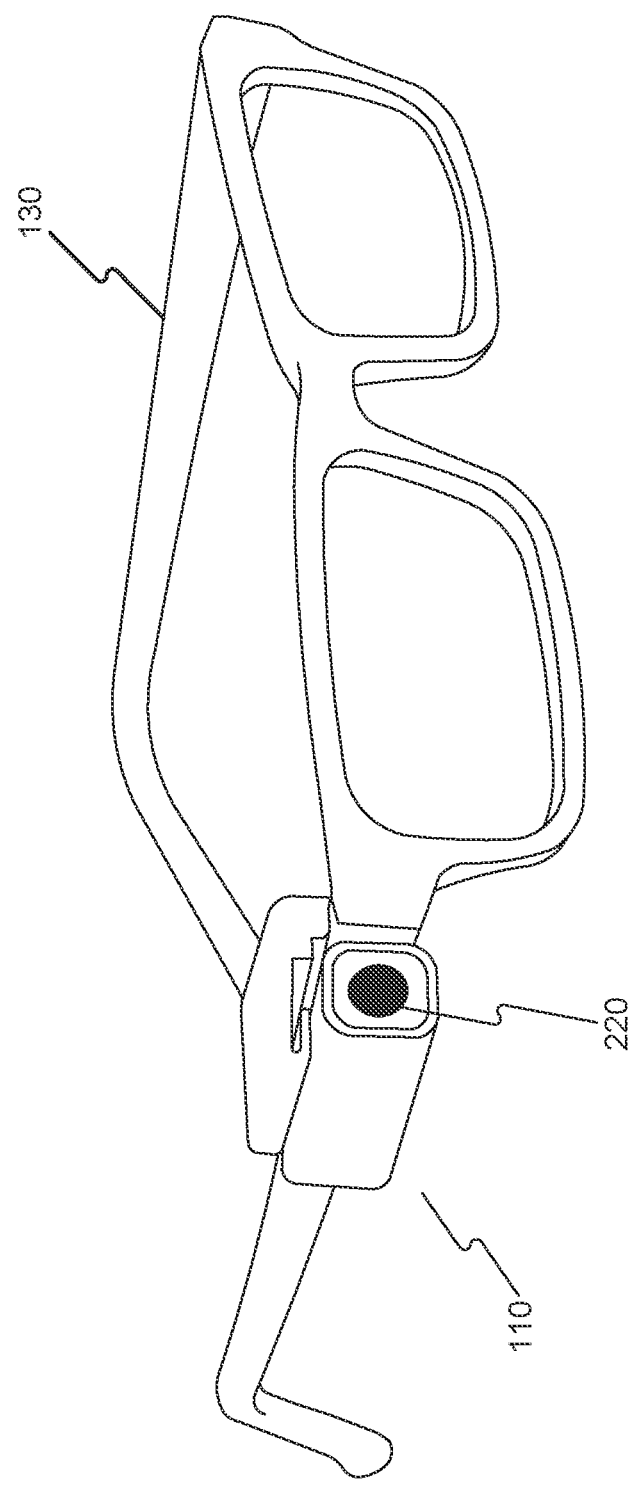
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
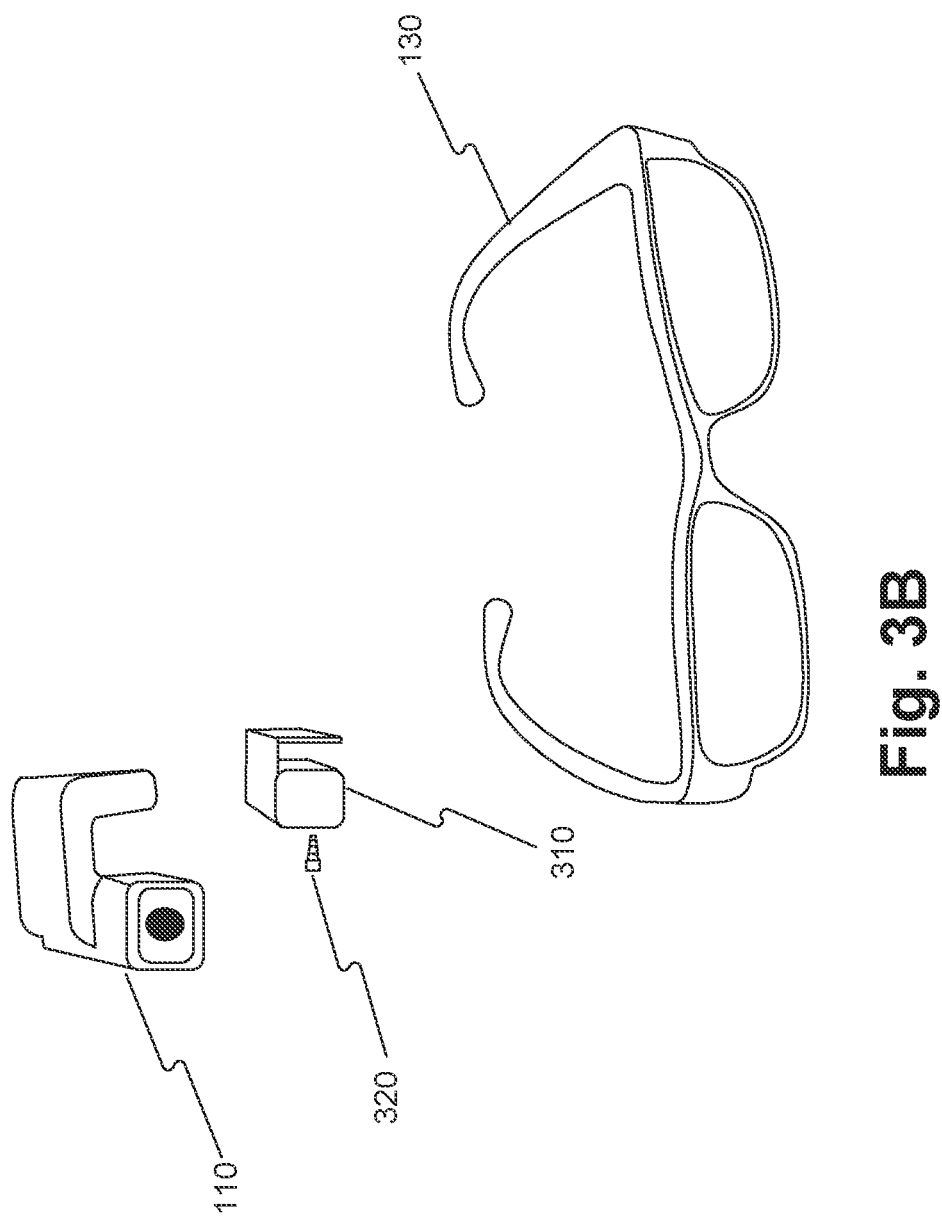
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
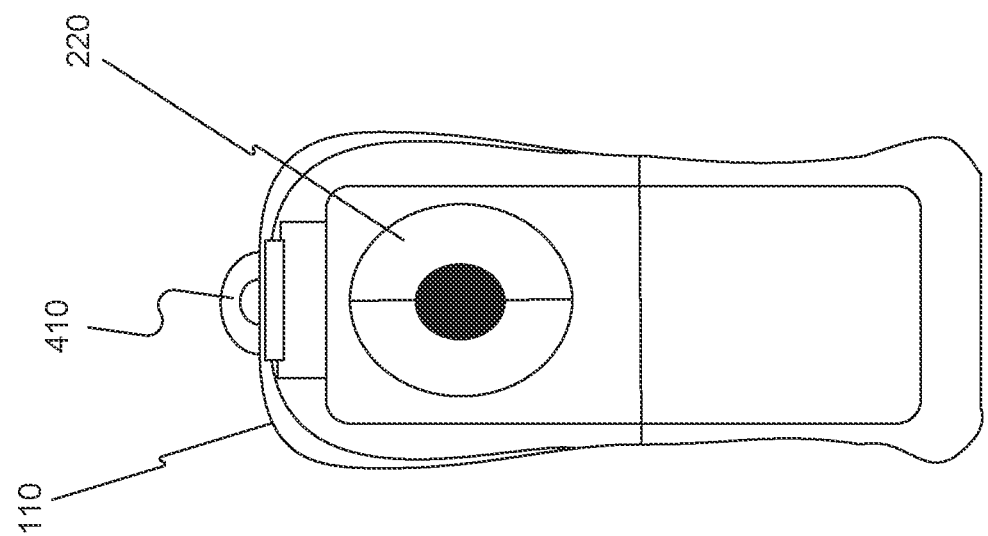
FIG. 4A-4K are schematic illustrations of an example of the wearable apparatus shown in FIG. 1B from various viewpoints.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a front viewpoint of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
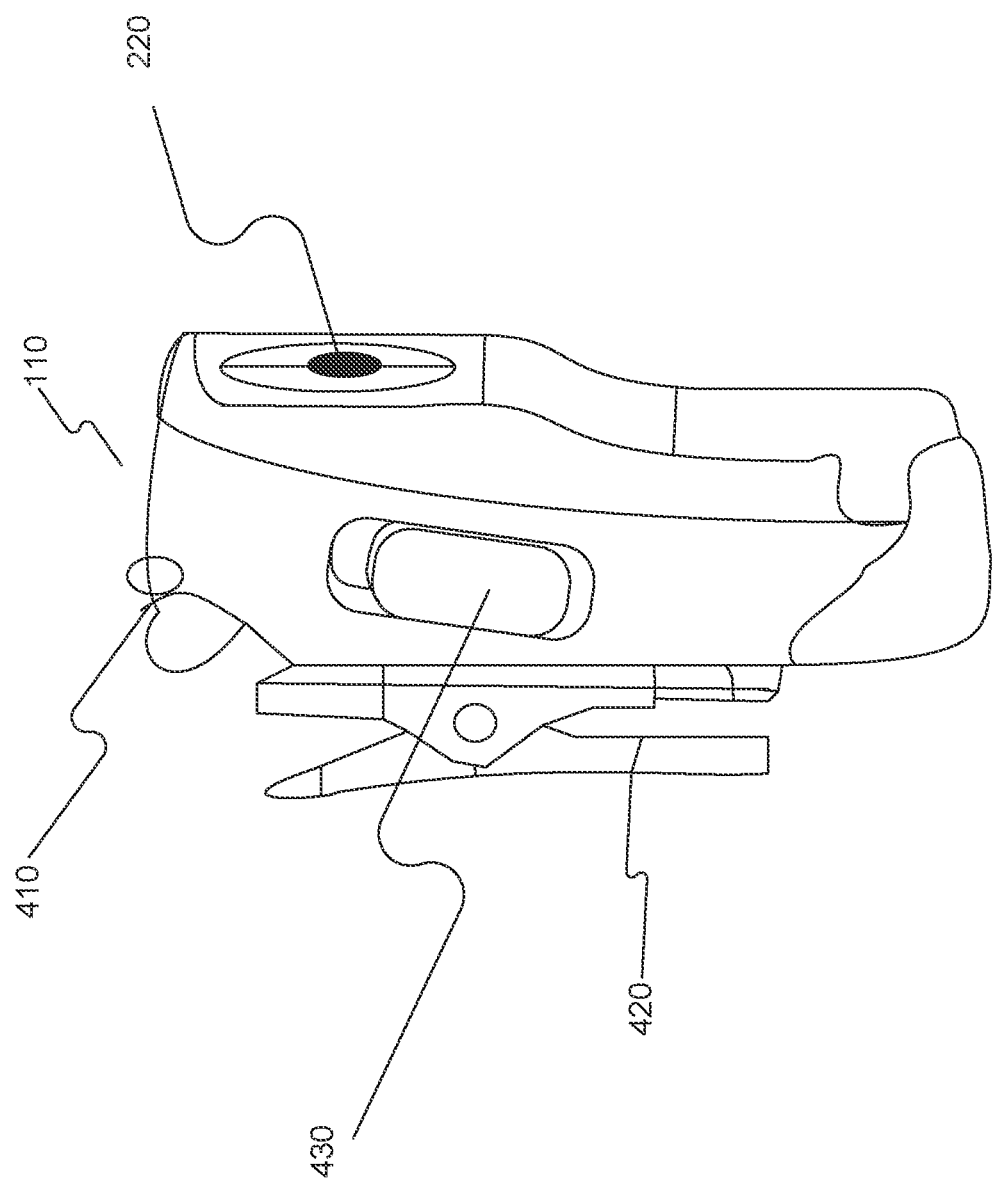

FIG. 4B is a schematic illustration of the example of a second embodiment of apparatus 110, from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and re-engaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

Figure 4C:
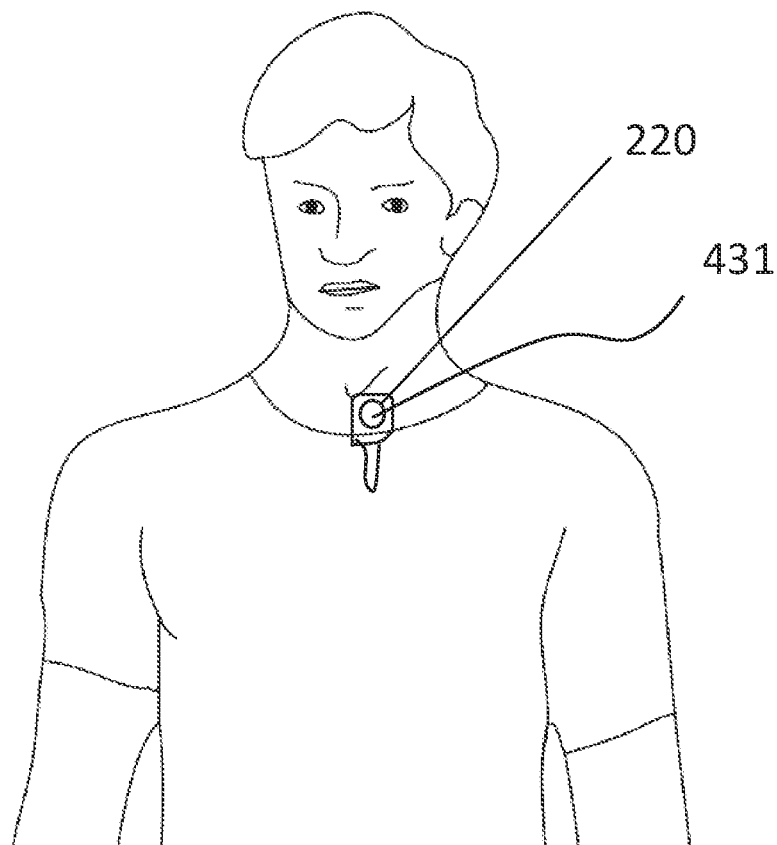

Apparatus 110 may be attached to an article of clothing (e.g., a shirt, a belt, pants, etc.), of user 100 at an edge of the clothing using a clip 431 as shown in FIG. 4C. For example, the body of apparatus 100 may reside adjacent to the inside surface of the clothing with clip 431 engaging with the outside surface of the clothing. In such an embodiment, as shown in FIG. 4C, the image sensor 220 (e.g., a camera for visible light) may be protruding beyond the edge of the clothing. Alternatively, clip 431 may be engaging with the inside surface of the clothing with the body of apparatus 110 being adjacent to the outside of the clothing. In various embodiments, the clothing may be positioned between clip 431 and the body of apparatus 110.

Figure 4D:
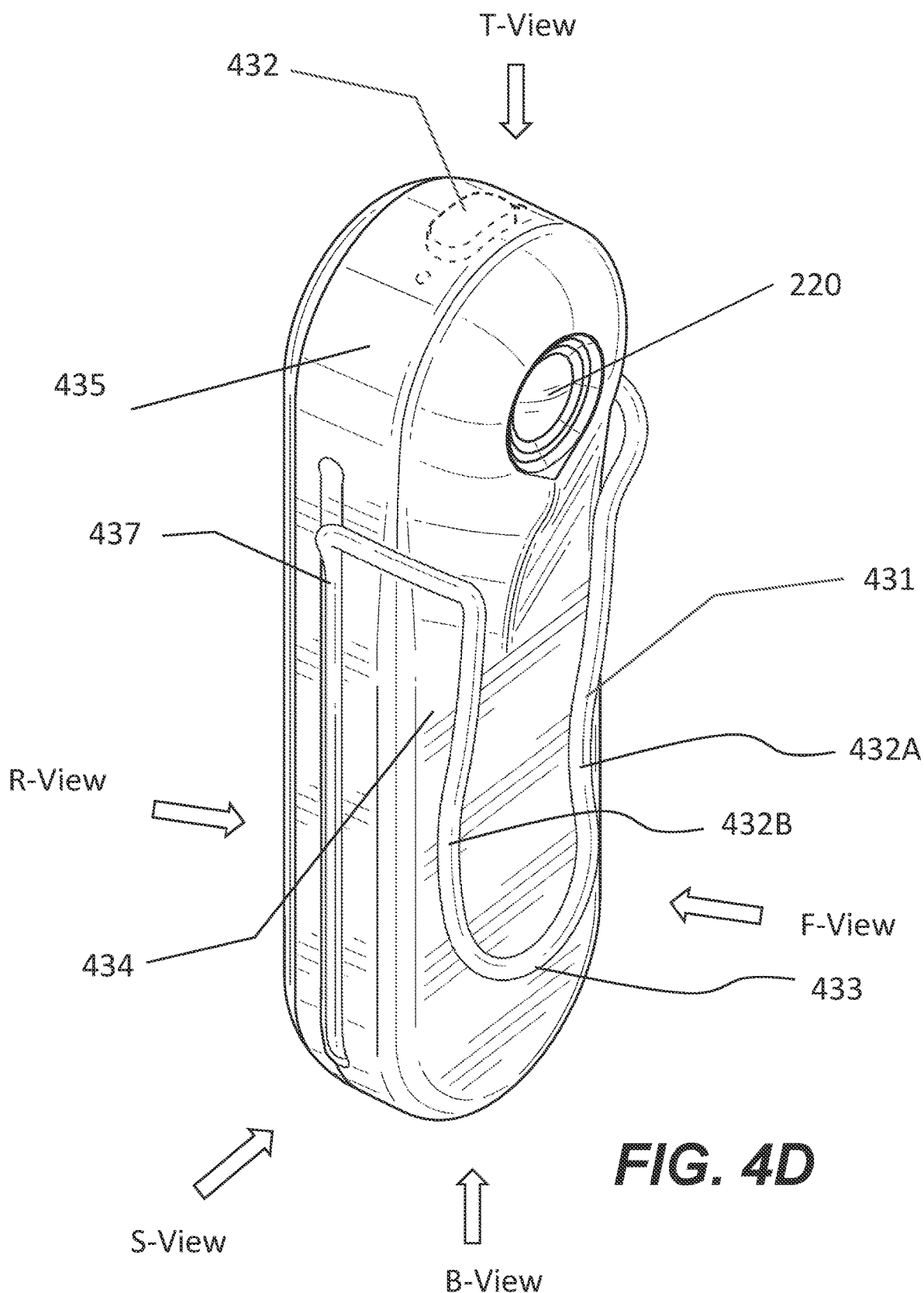

An example embodiment of apparatus 110 is shown in FIG. 4D. Apparatus 110 includes clip 431 which may include points (e.g., 432A and 432B) in close proximity to a front surface 434 of a body 435 of apparatus 110. In an example embodiment, the distance between points 432A, 432B and front surface 434 may be less than a typical thickness of a fabric of the clothing of user 100. For example, the distance between points 432A, 432B and surface 434 may be less than a thickness of a tee-shirt, e.g., less than a millimeter, less than 2 millimeters, less than 3 millimeters, etc., or, in some cases, points 432A, 432B of clip 431 may touch surface 434. In various embodiments, clip 431 may include a point 433 that does not touch surface 434, allowing the clothing to be inserted between clip 431 and surface 434.

FIG. 4D shows schematically different views of apparatus 110 defined as a front view (F-view), a rearview (R-view), a top view (T-view), a side view (S-view) and a bottom view (B-view). These views will be referred to when describing apparatus 110 in subsequent figures. FIG. 4D shows an example embodiment where clip 431 is positioned at the same side of apparatus 110 as sensor 220 (e.g., the front side of apparatus 110). Alternatively, clip 431 may be positioned at an opposite side of apparatus 110 as sensor 220 (e.g., the rear side of apparatus 110). In various embodiments, apparatus 110 may include function button 430, as shown in FIG. 4D.

Figure 4E:
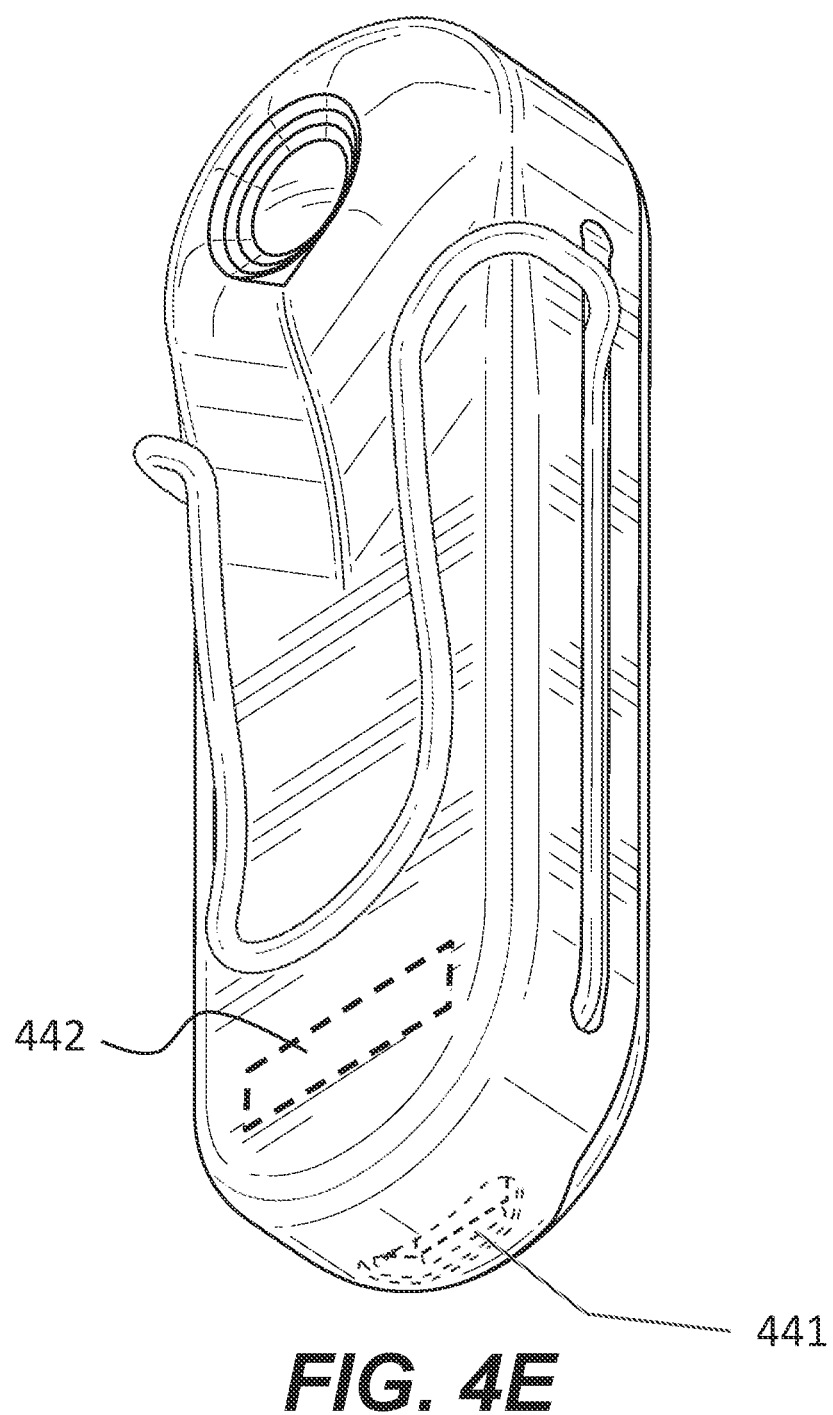
Figure 4F:
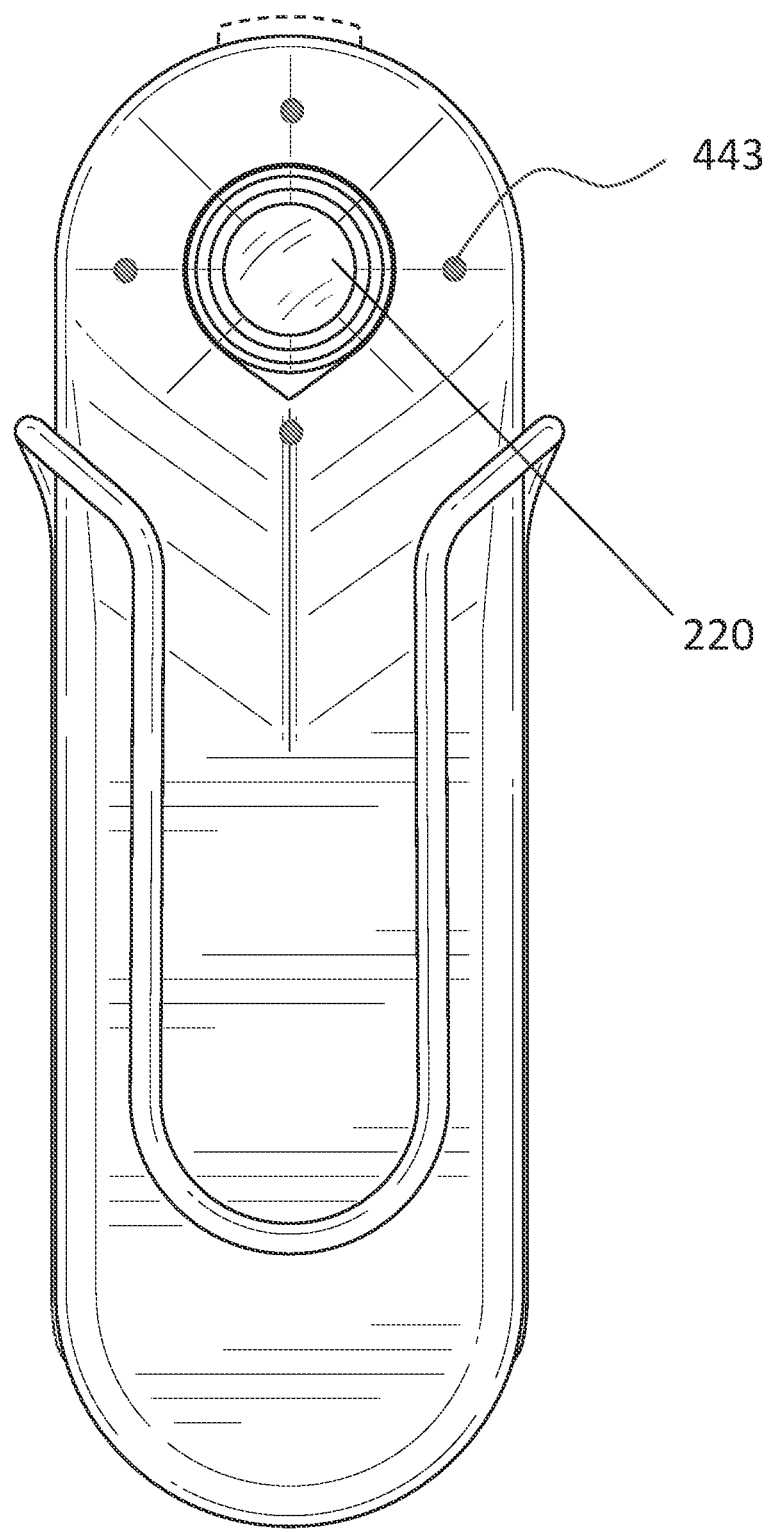
Figure 4G:
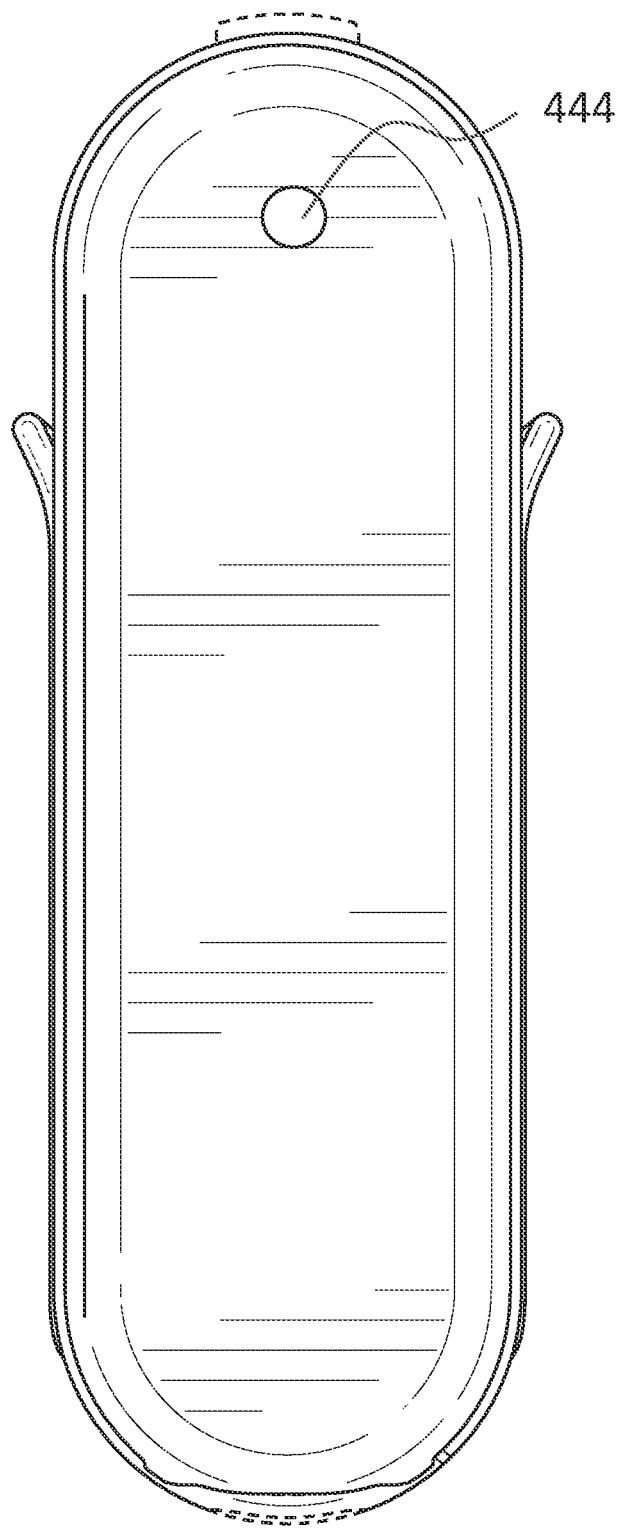

Various views of apparatus 110 are illustrated in FIGS. 4E through 4K. For example, FIG. 4E shows a view of apparatus 110 with an electrical connection 441. Electrical connection 441 may be, for example, a USB port, that may be used to transfer data to/from apparatus 110 and provide electrical power to apparatus 110. In an example embodiment, connection 441 may be used to charge a battery 442 schematically shown in FIG. 4E. FIG. 4F shows F-view of apparatus 110, including sensor 220 and one or more microphones 443. In some embodiments, apparatus 110 may include several microphones 443 facing outwards, wherein microphones 443 are configured to obtain environmental sounds and sounds of various speakers communicating with user 100. FIG. 4G shows R-view of apparatus 110. In some embodiments, microphone 444 may be positioned at the rear side of apparatus 110, as shown in FIG. 4G. Microphone 444 may be used to detect an audio signal from user 100. It should be noted that apparatus 110 may have microphones placed at any side (e.g., a front side, a rear side, a left side, a right side, a top side, or a bottom side) of apparatus 110. In various embodiments, some microphones may be at a first side (e.g., microphones 443 may be at the front of apparatus 110) and other microphones may be at a second side (e.g., microphone 444 may be at the back side of apparatus 110).

Figure 4H:
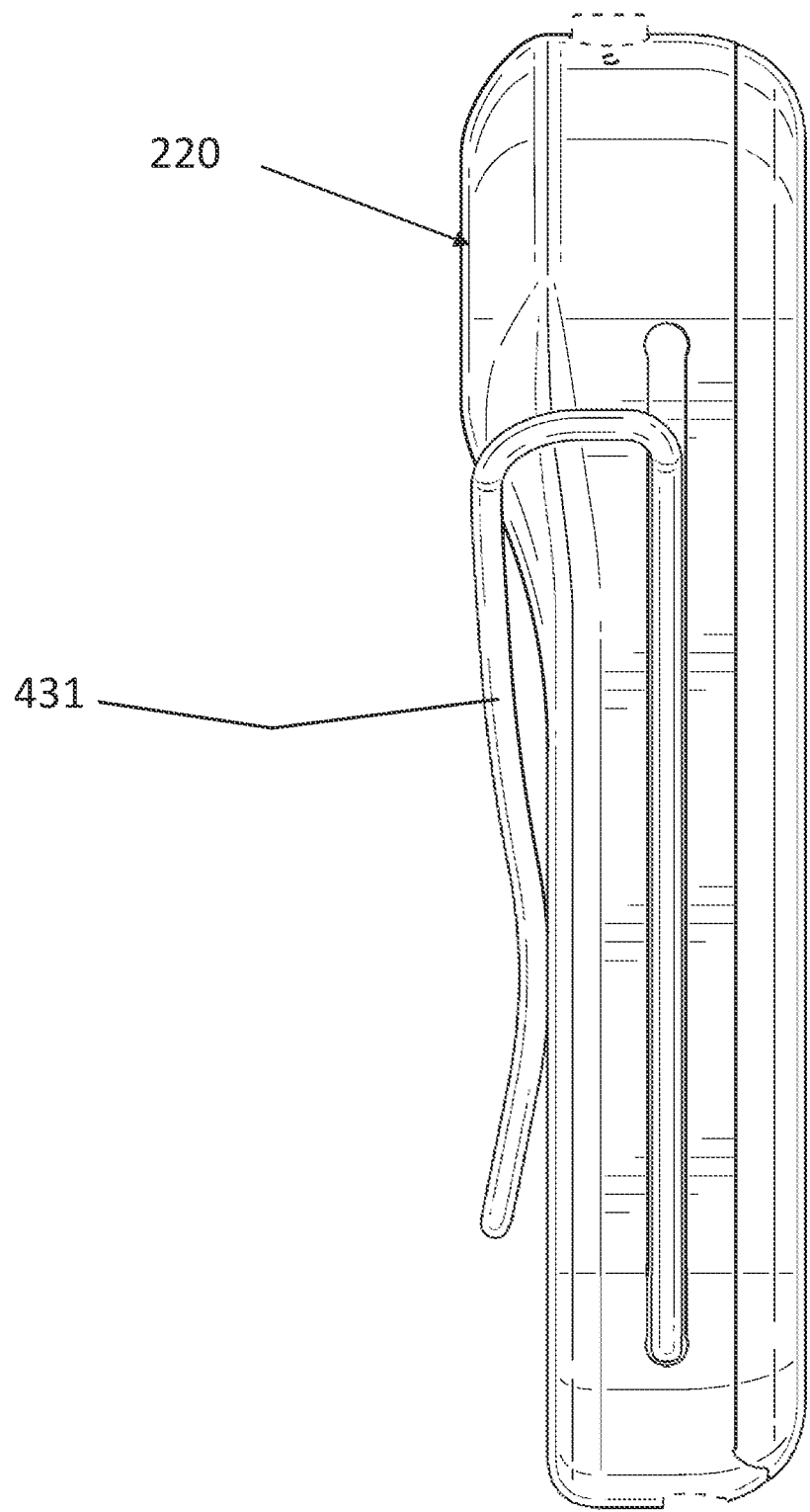
Figure 4I:
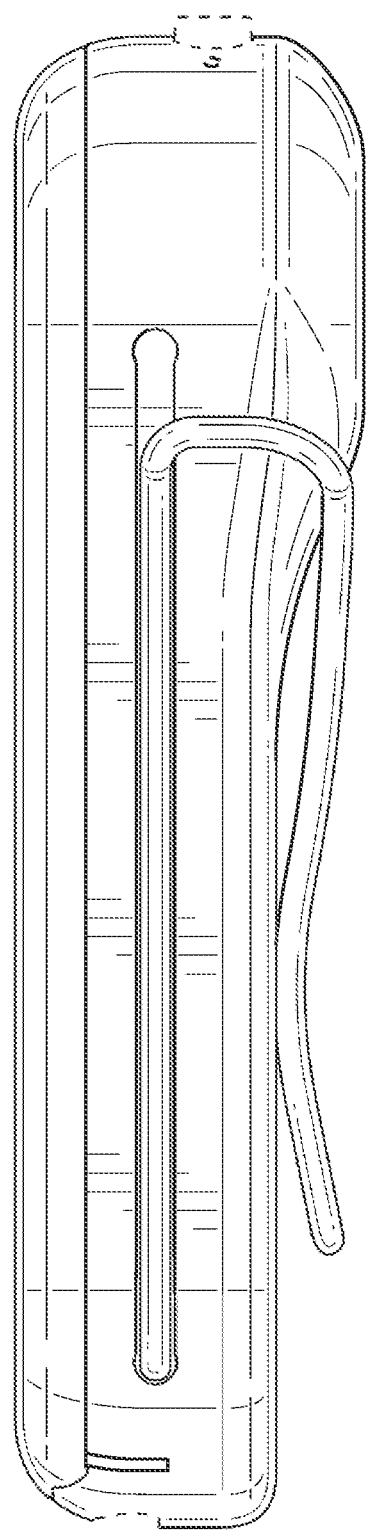
Figure 4J:
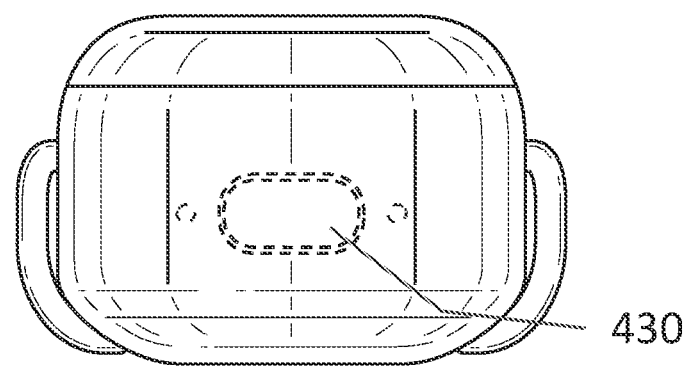
Figure 4K:
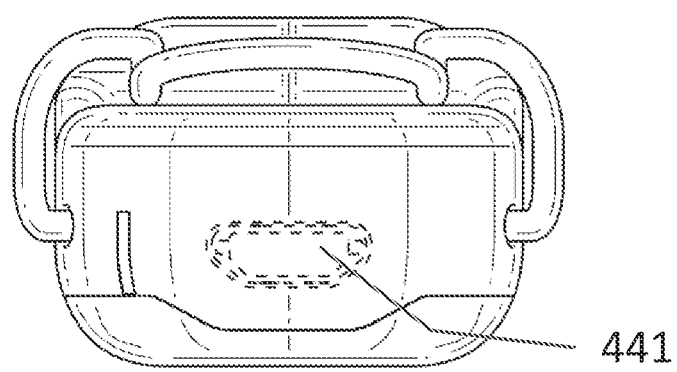

FIGS. 4H and 4I show different sides of apparatus 110 (i.e., S-view of apparatus 110) consisted with disclosed embodiments. For example, FIG. 4H shows the location of sensor 220 and an example shape of clip 431. FIG. 4J shows T-view of apparatus 110, including function button 430, and FIG. 4K shows B-view of apparatus 110 with electrical connection 441.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
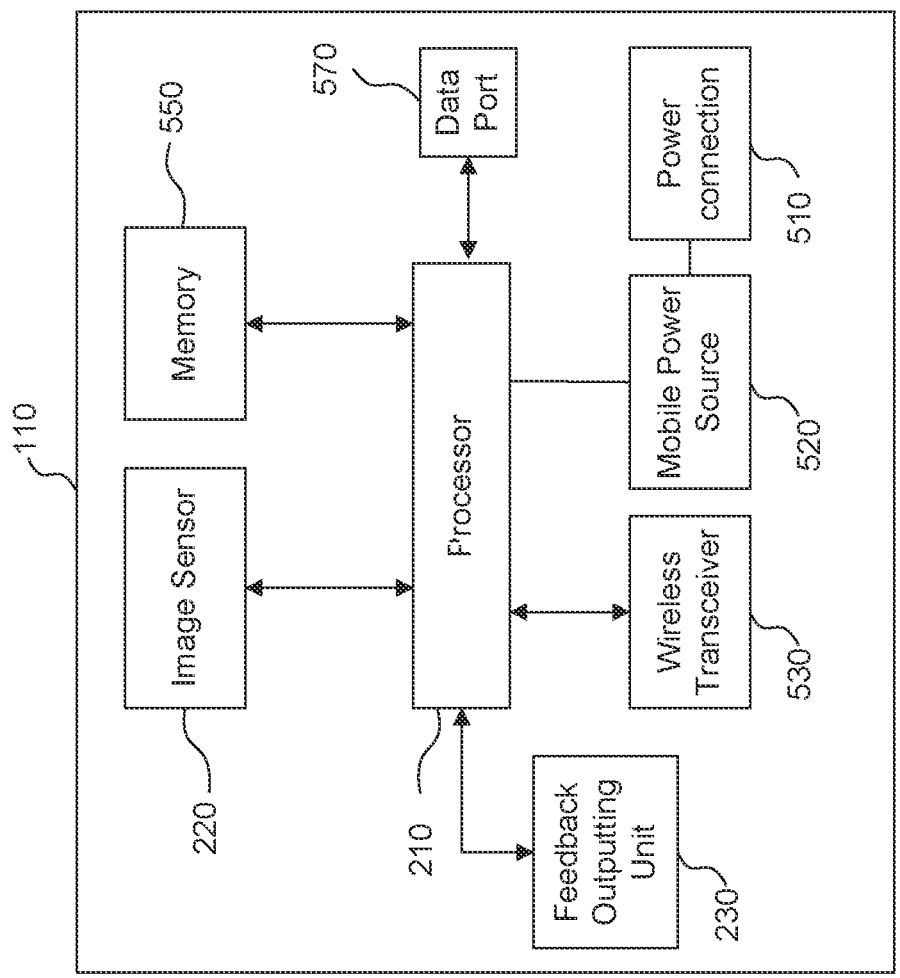
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments, memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
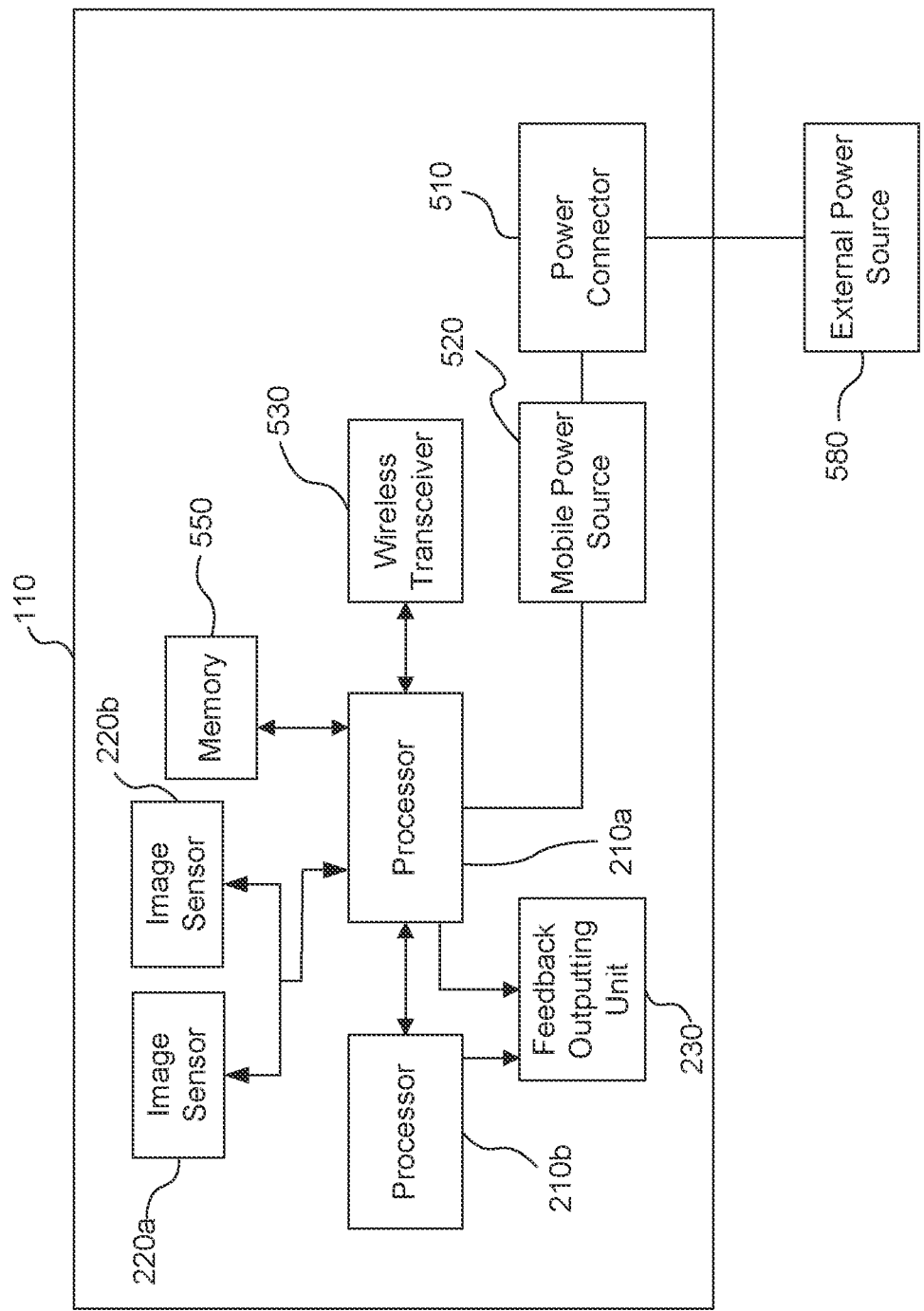
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
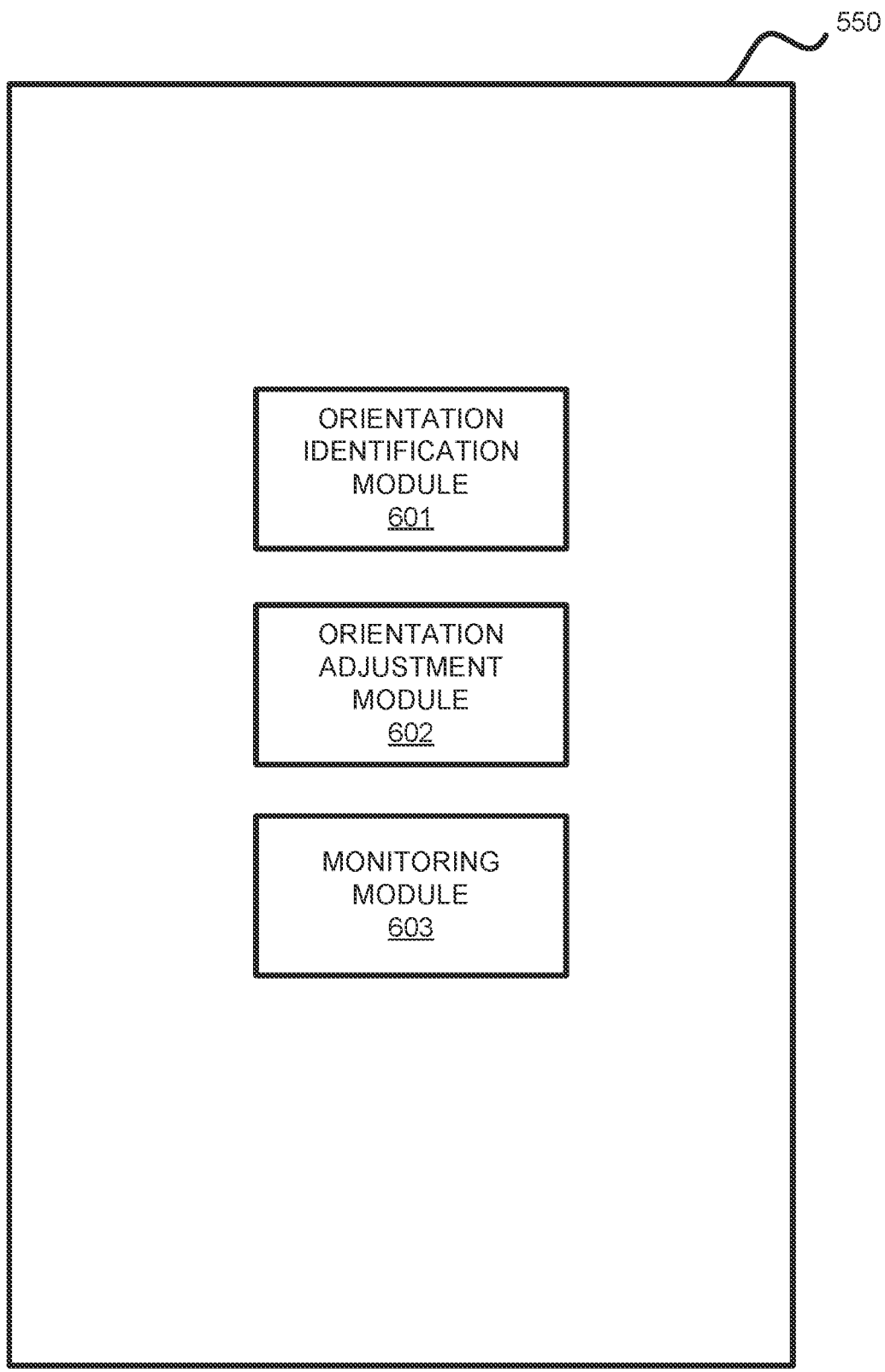
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
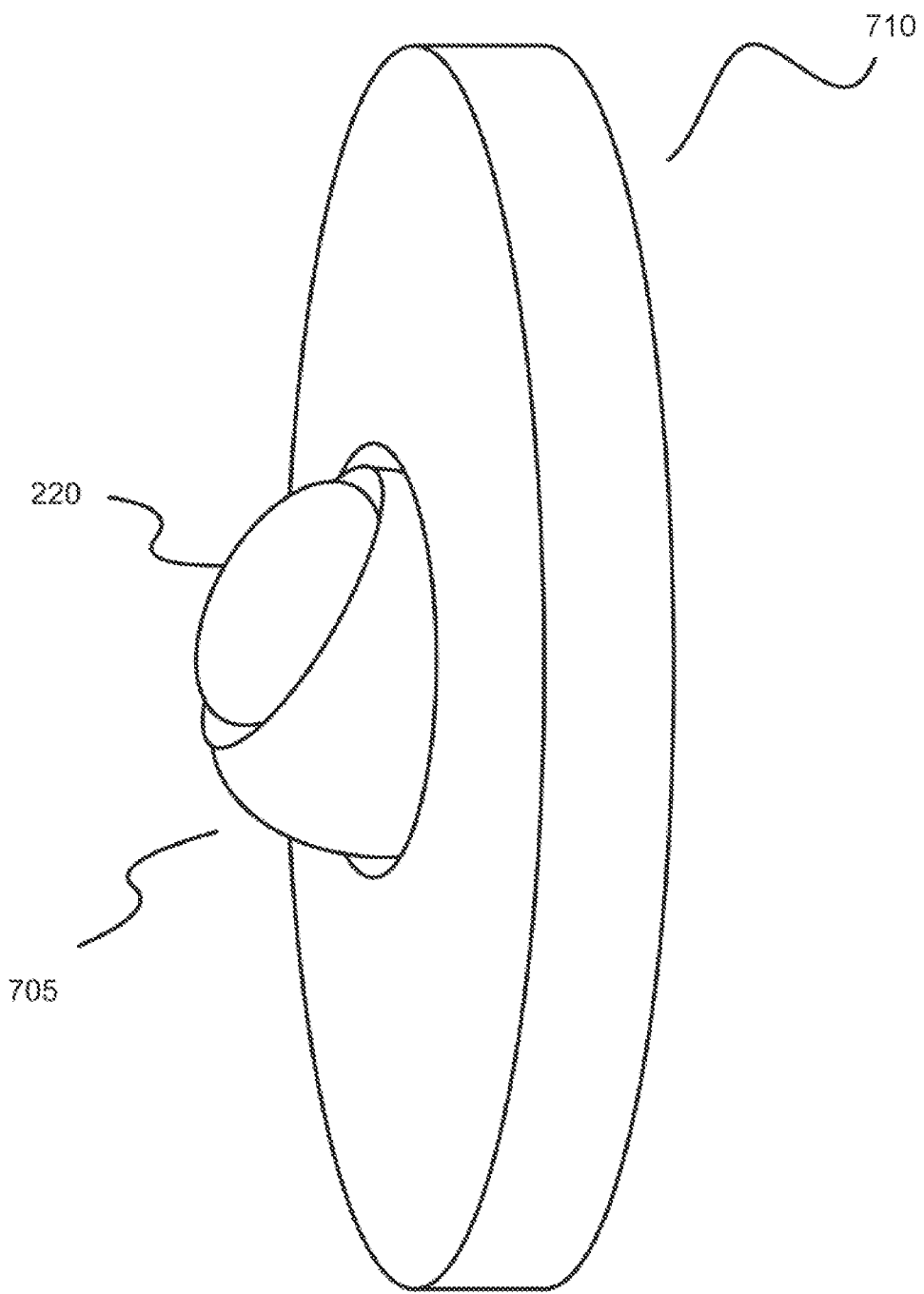
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments, orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments, consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required or preferred. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
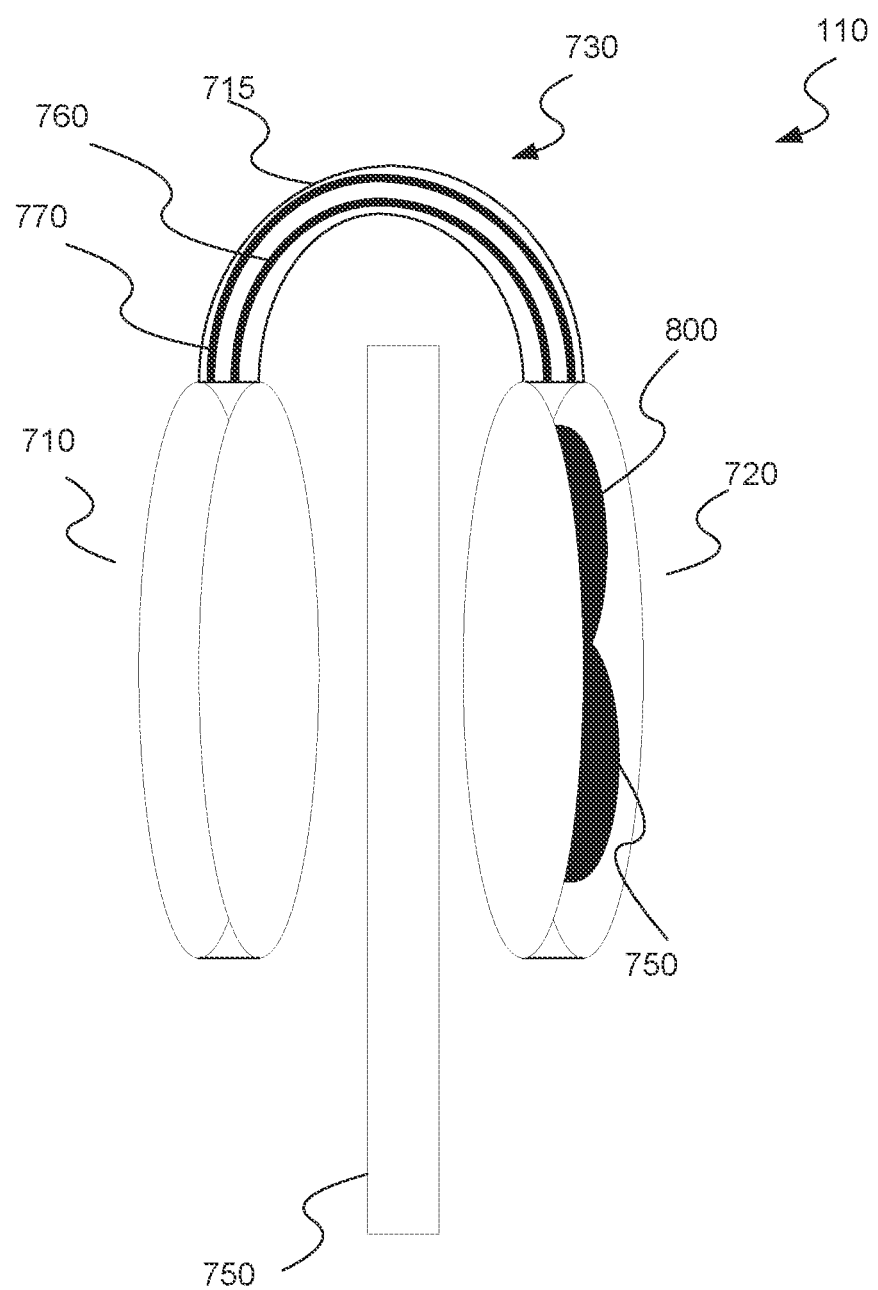
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
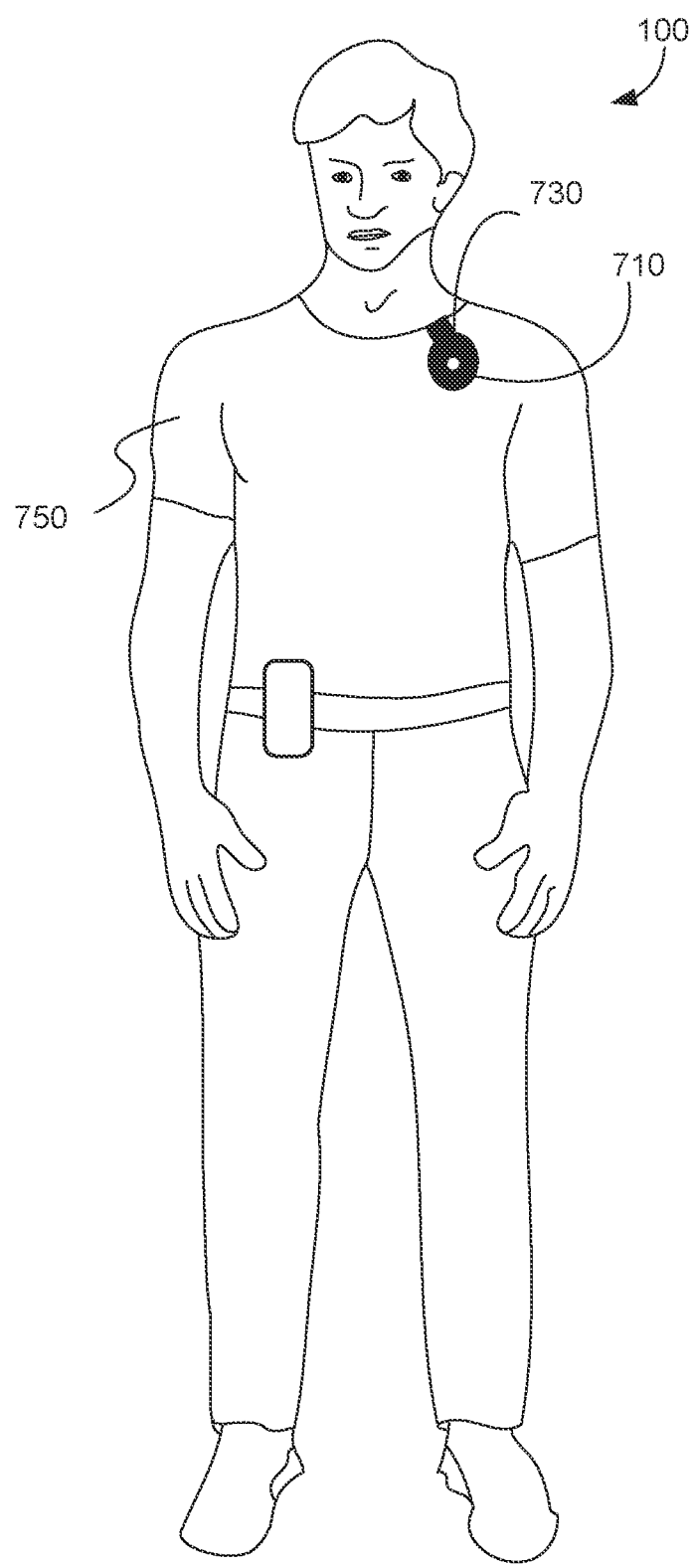
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
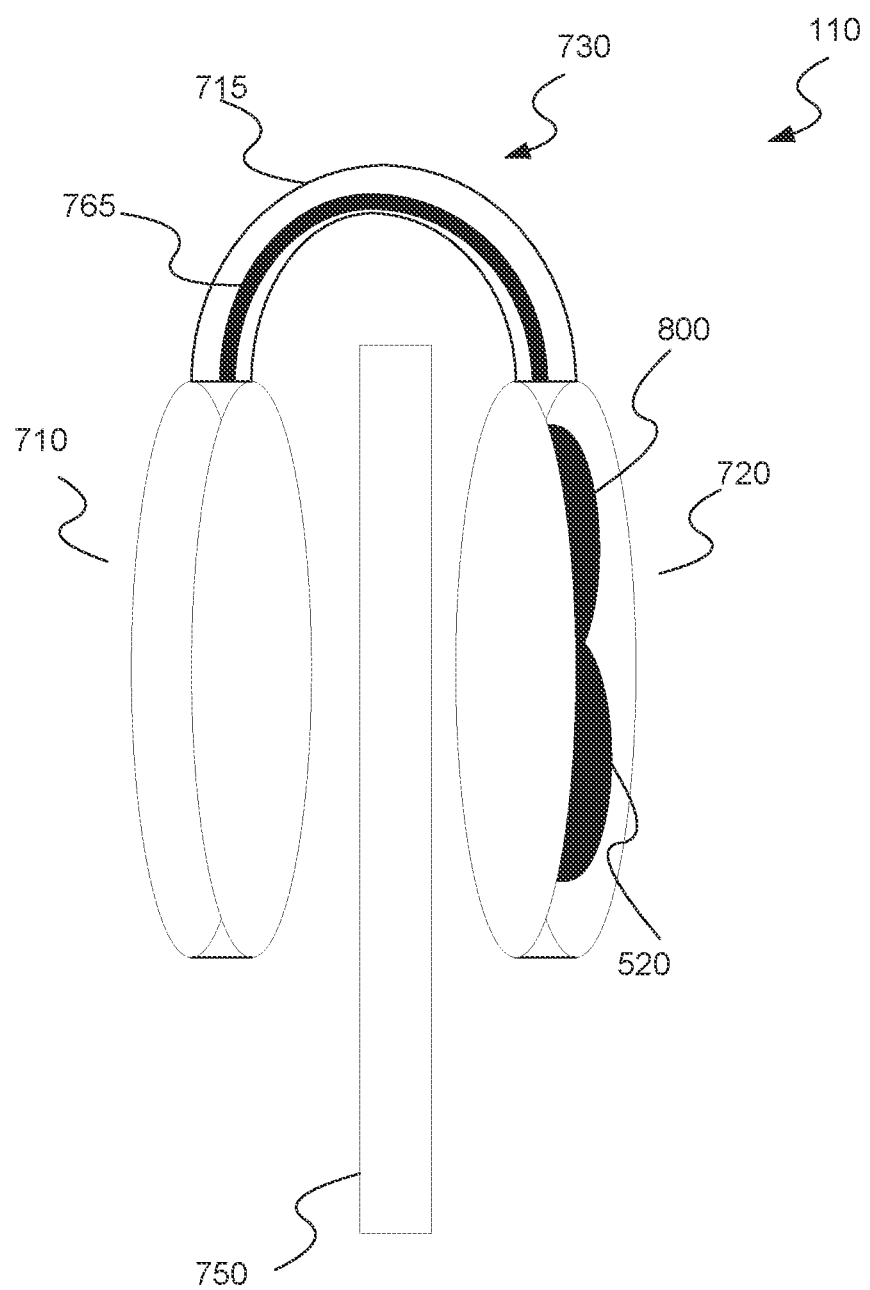
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
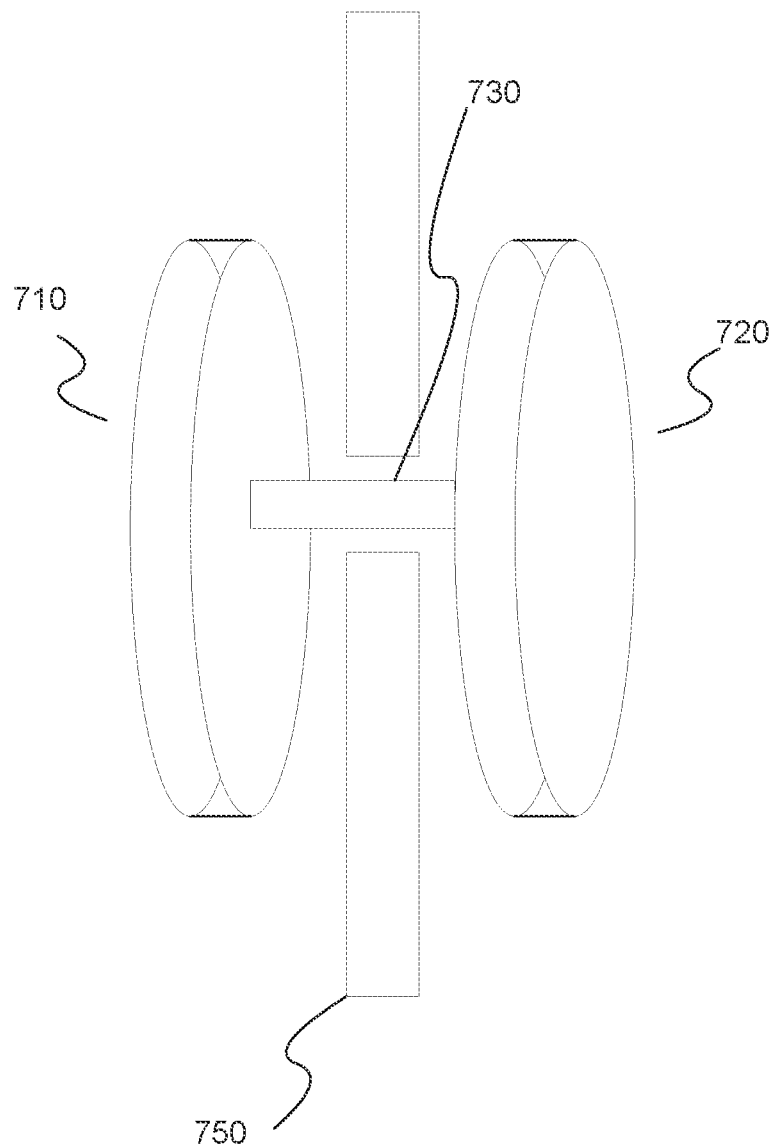
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
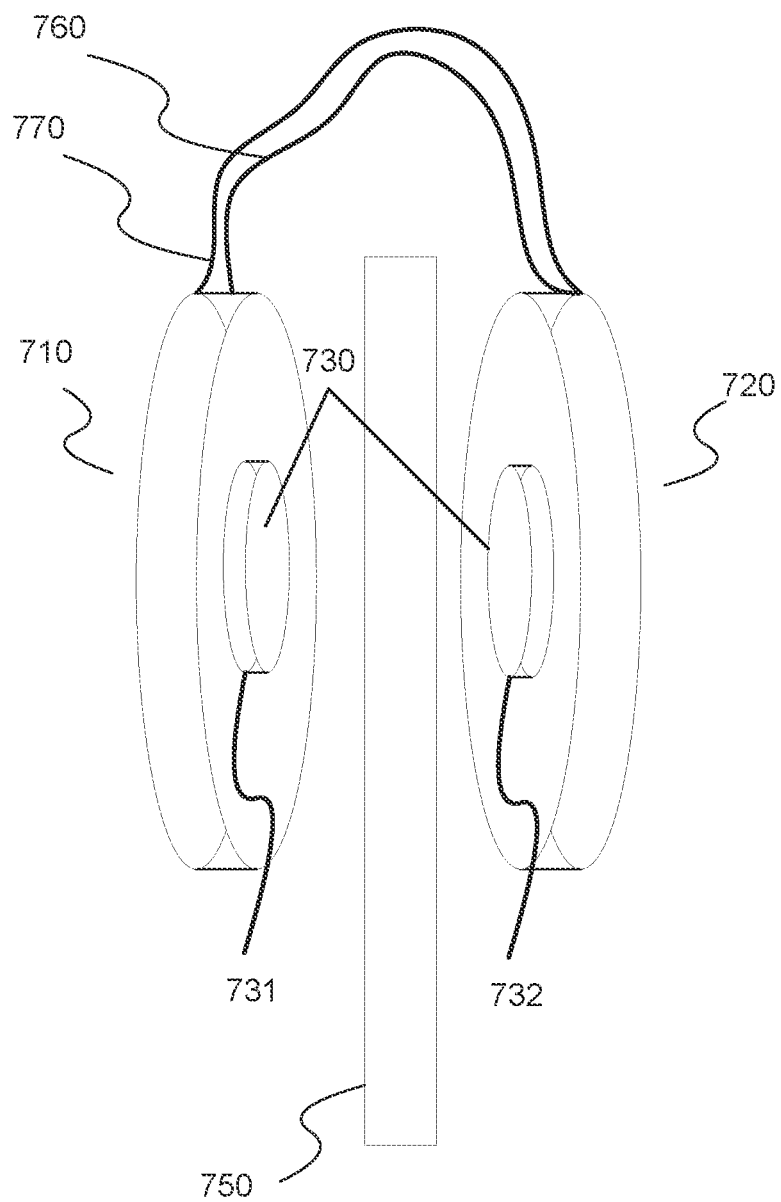
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
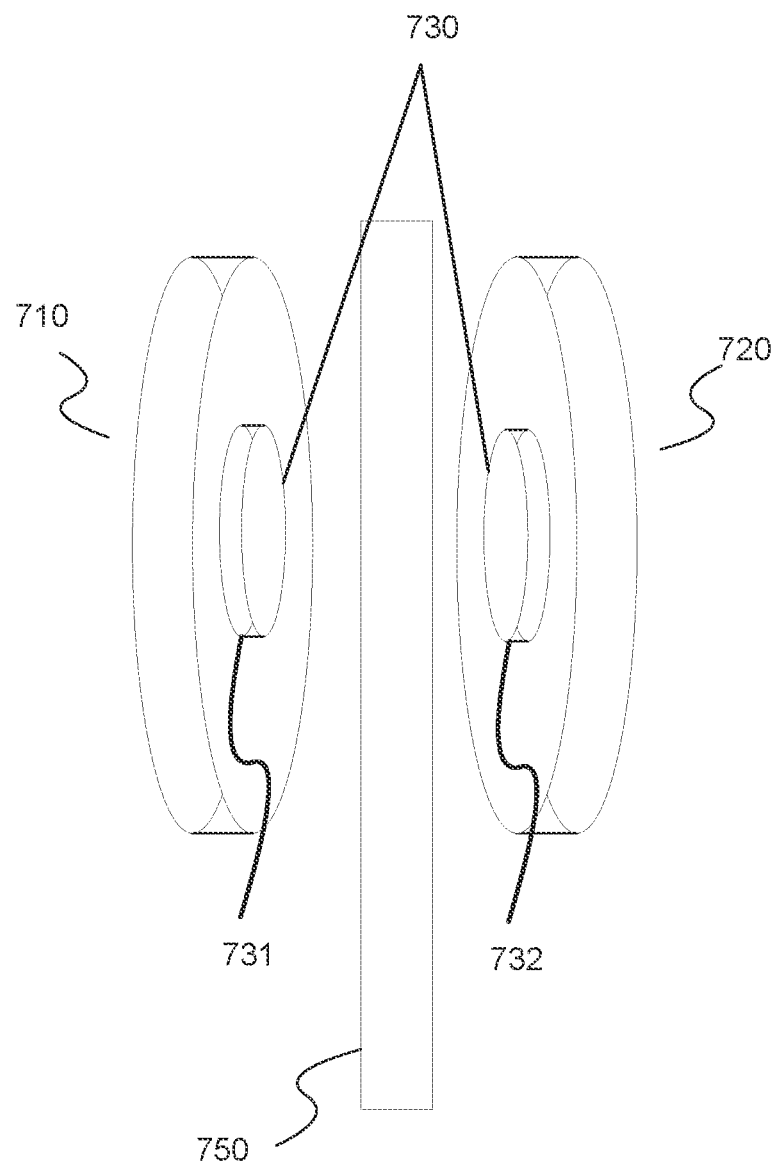
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
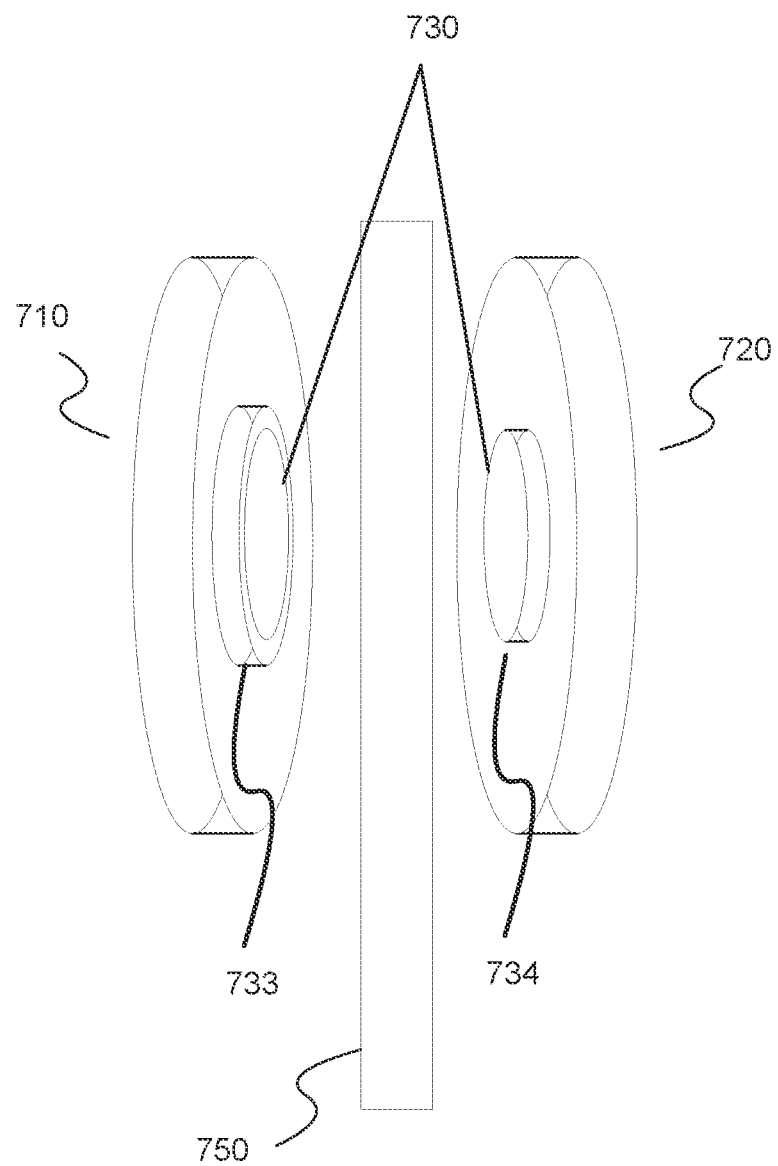
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
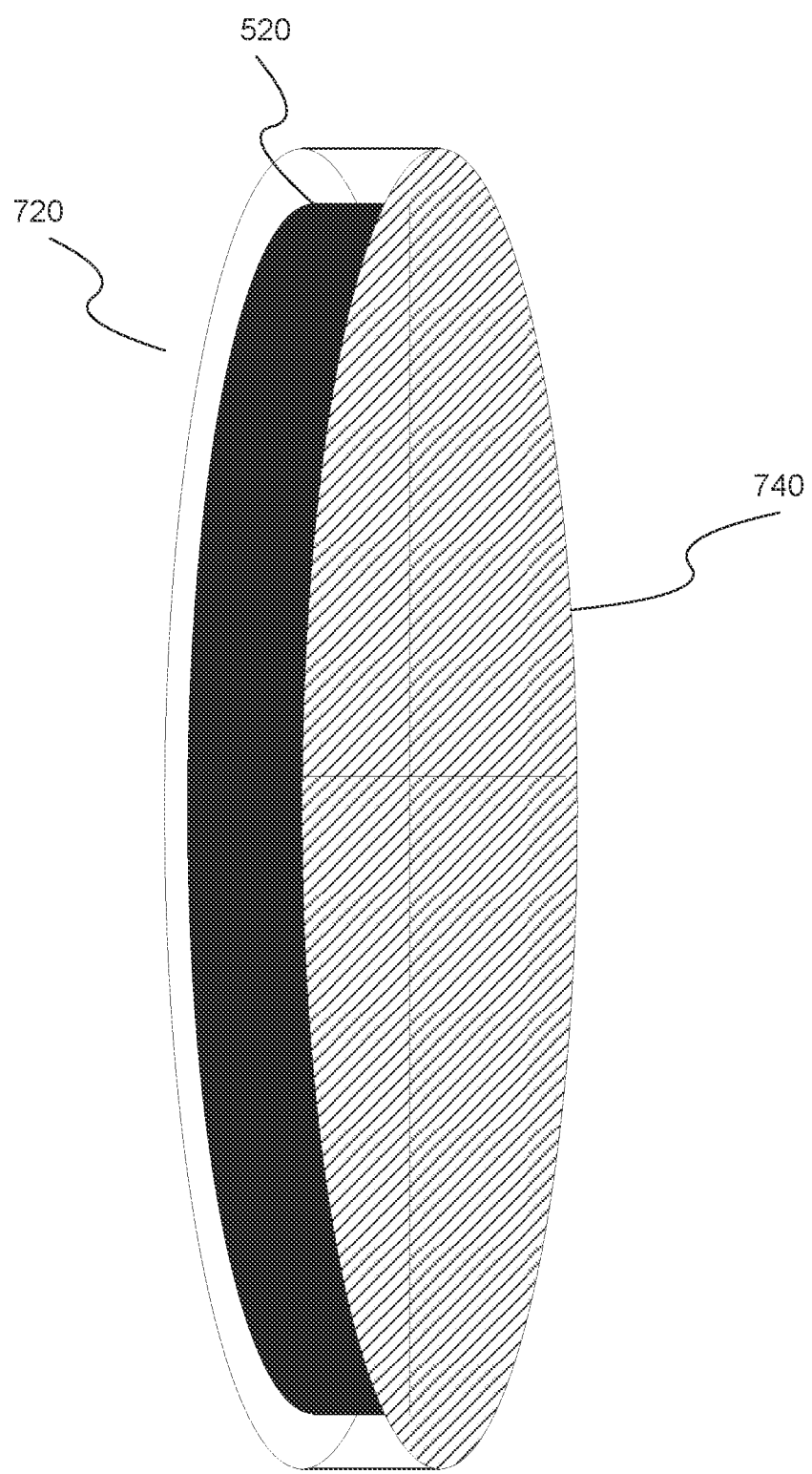
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
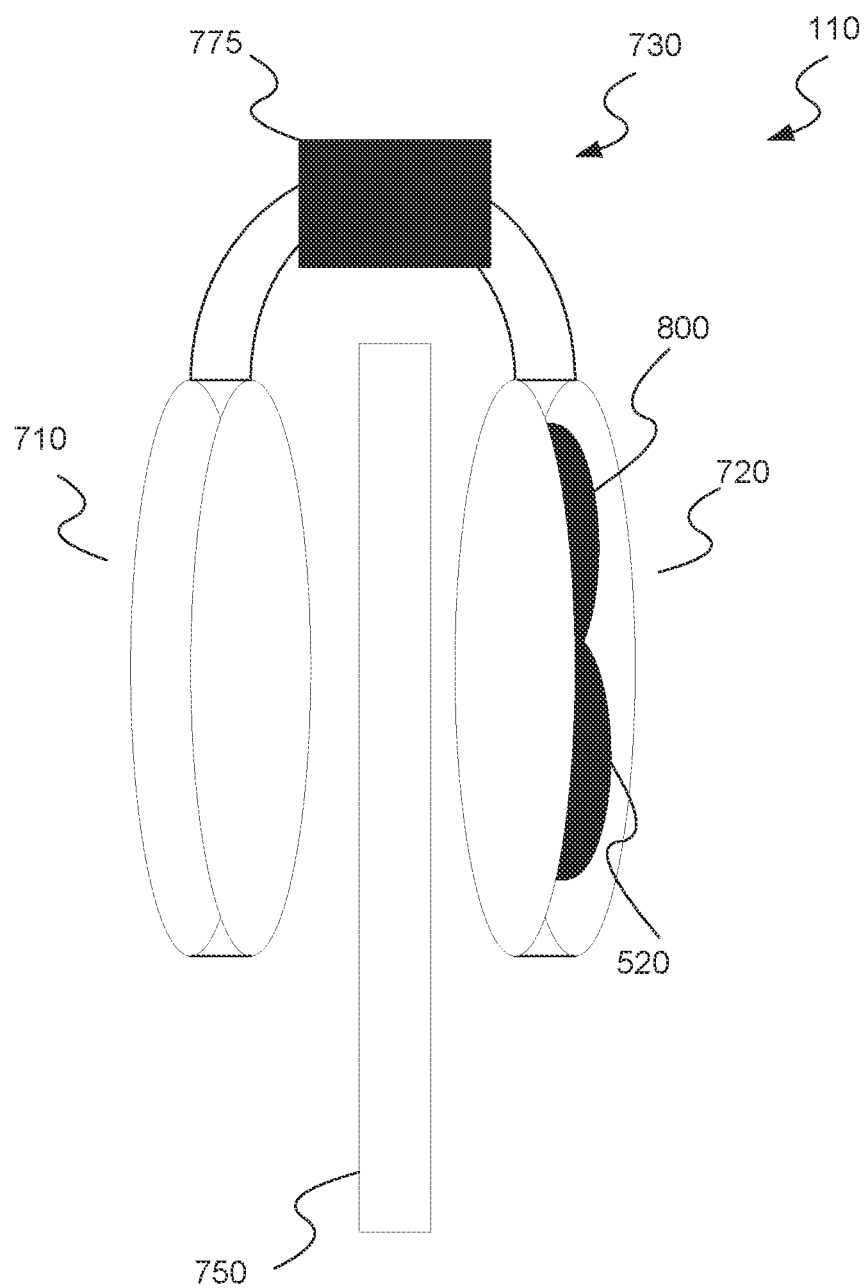
FIG. 16 is a schematic illustration of an exemplary embodiment of a wearable apparatus including protective circuitry.

In further embodiments, an apparatus securable to an article of clothing may further include protective circuitry associated with power source 520 housed in in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220.

In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sports team may be obtained using audio recognition algorithms.

A wearable apparatus consistent with the disclosed embodiments may be used in social events to identify individuals in the environment of a user of the wearable apparatus and provide contextual information associated with the individual. For example, the wearable apparatus may determine whether an individual is known to the user, or whether the user has previously interacted with the individual. The wearable apparatus may provide an indication to the user about the identified person, such as a name of the individual or other identifying information. The device may also extract any information relevant to the individual, for example, words extracted from a previous encounter between the user and the individual, topics discussed during the encounter, or the like. The device may also extract and display information from external source, such as the internet. Further, regardless of whether the individual is known to the user or not, the wearable apparatus may pull available information about the individual, such as from a web page, a social network, etc. and provide the information to the user.

This content information may be beneficial for the user when interacting with the individual. For example, the content information may remind the user who the individual is. For example, the content information may include a name of the individual, or topics discussed with the individual, which may remind the user of how he or she knows the individual. Further, the content information may provide talking points for the user when conversing with the individual. for example, the user may recall previous topics discussed with the individual, which the user may want to bring up again. In some embodiments, for example where the content information is derived from a social media or blog post, the user may bring up topics that the user and the individual have not discussed yet, such as an opinion or point of view of the individual, events in the individual's life, or other similar information. Thus, the disclosed embodiments may provide, among other advantages, improved efficiency, convenience, and functionality over prior art devices.

Figure 17A:
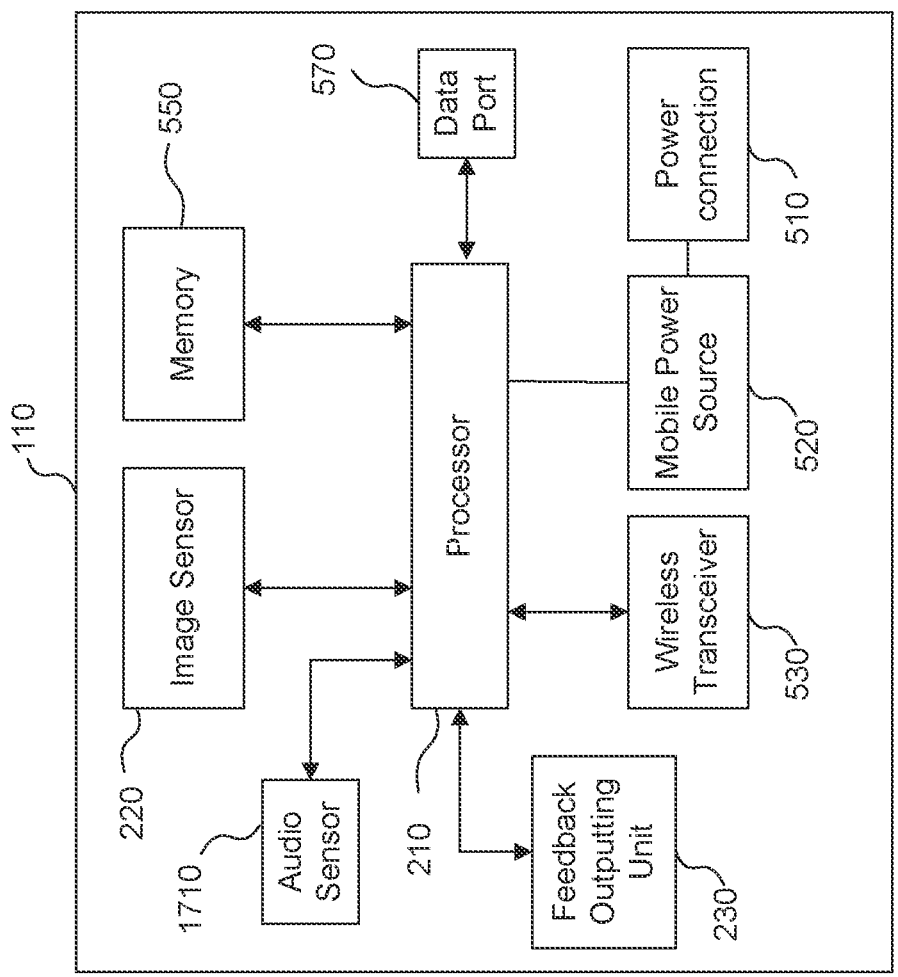
FIG. 17A is a block diagram illustrating components of a wearable apparatus according to an example embodiment.

In some embodiments, apparatus 110 may be configured to use audio information in addition to image information. For example, apparatus 110 may detect and capture sounds in the environment of the user, via one or more microphones. Apparatus 110 may use this audio information instead of, or in combination with, image information to determine situations, identify persons, perform activities, or the like. FIG. 17A is a block diagram illustrating components of wearable apparatus 110 according to an example embodiment. FIG. 17A may include the features shown in FIG. 5A. For example, as discussed in greater detail above, wearable apparatus may include processor 210, image sensor 220, memory 550, wireless transceiver 530 and various other components as shown in FIG. 17A. Wearable apparatus may further comprise an audio sensor 1710. Audio sensor 1710 may be any device capable of capturing sounds from an environment of a user and converting them to one or more audio signals. For example, audio sensor 1710 may comprise a microphone or another sensor (e.g., a pressure sensor, which may encode pressure differences comprising sound) configured to encode sound waves as a digital signal. As shown in FIG. 17A, processor 210 may analyze signals from audio sensor 1710 in addition to signals from image sensor 220.

Figure 17B:
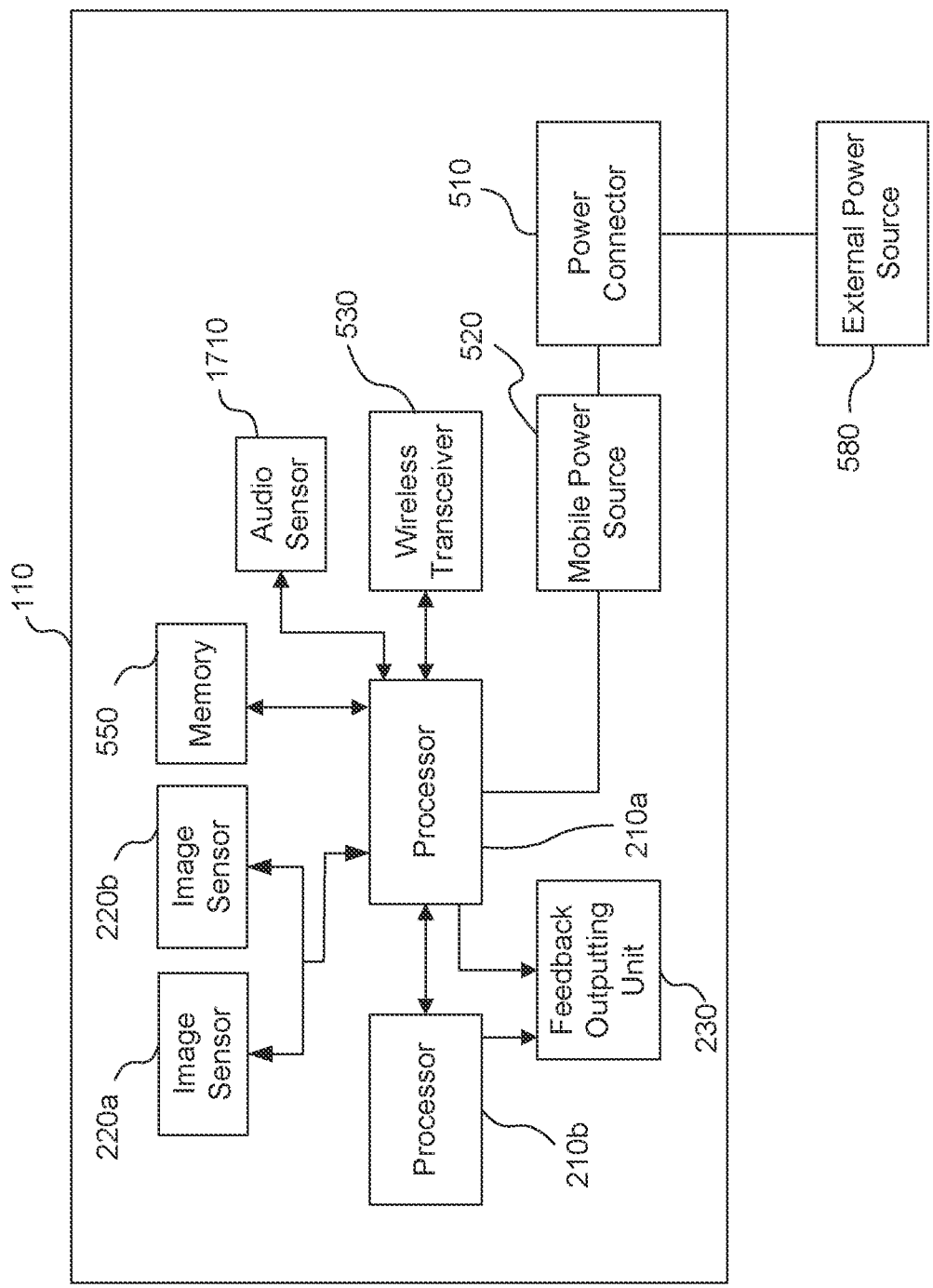
FIG. 17B is a block diagram illustrating the components of a wearable apparatus according to another example embodiment.

FIG. 17B is a block diagram illustrating the components of apparatus 110 according to another example embodiment. Similar to FIG. 17A, FIG. 17B includes all the features of FIG. 5B along with audio sensor 1710. Processor 210a may analyze signals from audio sensor 1710 in addition to signals from image sensors 210a and 210b. In addition, although FIGS. 17A and 17B each depict a single audio sensor, a plurality of audio sensors may be used, whether with a single image sensor as in FIG. 17A or with a plurality of image sensors as in FIG. 17B.

Figure 17C:
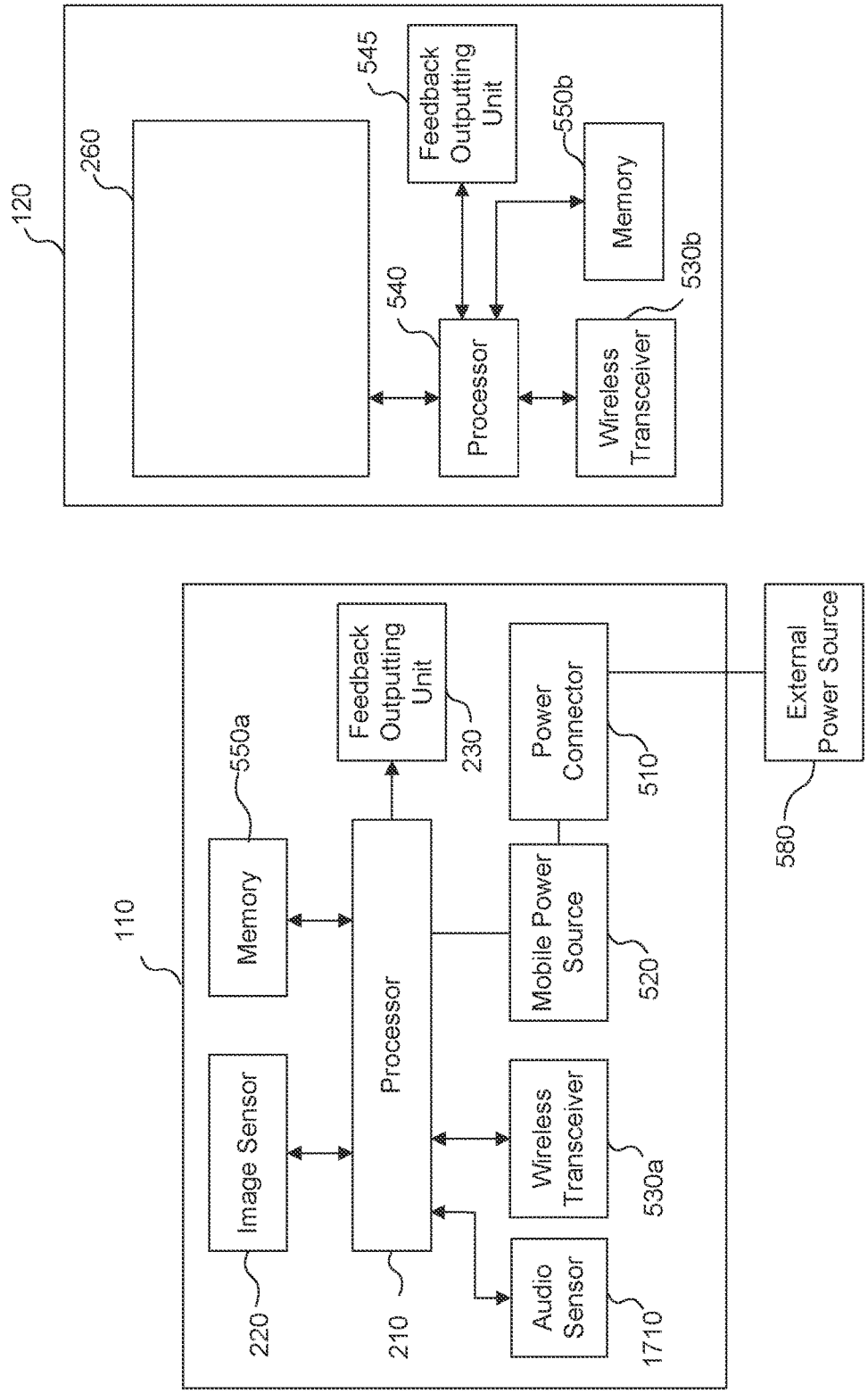
FIG. 17C is a block diagram illustrating the components of a wearable apparatus according to another example embodiment.

FIG. 17C is a block diagram illustrating components of wearable apparatus 110 according to an example embodiment. FIG. 17C includes all the features of FIG. 5C along with audio sensor 1710. As shown in FIG. 17C, wearable apparatus 110 may communicate with a computing device 120. In such embodiments, wearable apparatus 110 may send data from audio sensor 1710 to computing device 120 for analysis in addition to or in lieu of analyze the signals using processor 210.

Wearable Apparatus and Methods for Providing Transcription and/or Summary

A wearable apparatus consistent with the disclosed embodiments may be used in circumstances in which a user is using a device such as apparatus 110 in an environment of the user to capture images and record sound from the environment of the user. Apparatus 110 may perform additional actions, such as, recognizing people the user meets, separating recorded speech into segments in accordance with the different speakers, whether recognized by apparatus 110 or not, transcribing some or all of the recorded speech or the like. In an exemplary situation, a user such as a physician or another caregiver may wear apparatus 110 when meeting a plurality of people, such as patients, colleagues, or the like. The user (e.g., physician or caregiver) may then approach a computing platform such as a desktop computer, a laptop computer, a tablet or the like, into which he/she may need to enter some of the information collected during the meeting. For example, a physician may be interested in summarizing patient visits. Thus, one aspect of the present disclosure relates to a wearable apparatus that may capture and store an audio signal and/or one or more images associated with an environment of a user. Another aspect of the disclosure may relate to a system that includes a wearable apparatus and a computing platform (e.g., computing device 120, and/or server 250, etc.) Yet another aspect of the disclosure may relate to methods of providing a transcription or summary based on the one or more audio signals and/or one or more images captured by the wearable apparatus.

The disclosed wearable apparatus and methods may provide an advantageous way of automatic transfer of the transcription or summary information to the computing platform. For example, the computing platform may display an image representing a code, wherein the code may be associated with the user, for example generated by an application to which the user is logged in. Apparatus 110 may capture the image of the code displayed on the computing platform. Apparatus 110 may recognize the code displayed on the computing platform. Apparatus 110 may verify that a user of apparatus 110 is associated with the code. Following verification, apparatus 110 may transmit text, images, sounds, and/or other information previously collected or generated by apparatus 110 to the computing platform. It is to be understood that although a physician or caregiver is described above, the disclosed embodiments are not limited to environments associated with physicians or caregivers and may be used in other settings, for example, office settings, conference settings, parties, weddings, social settings, etc.

Figure 18:
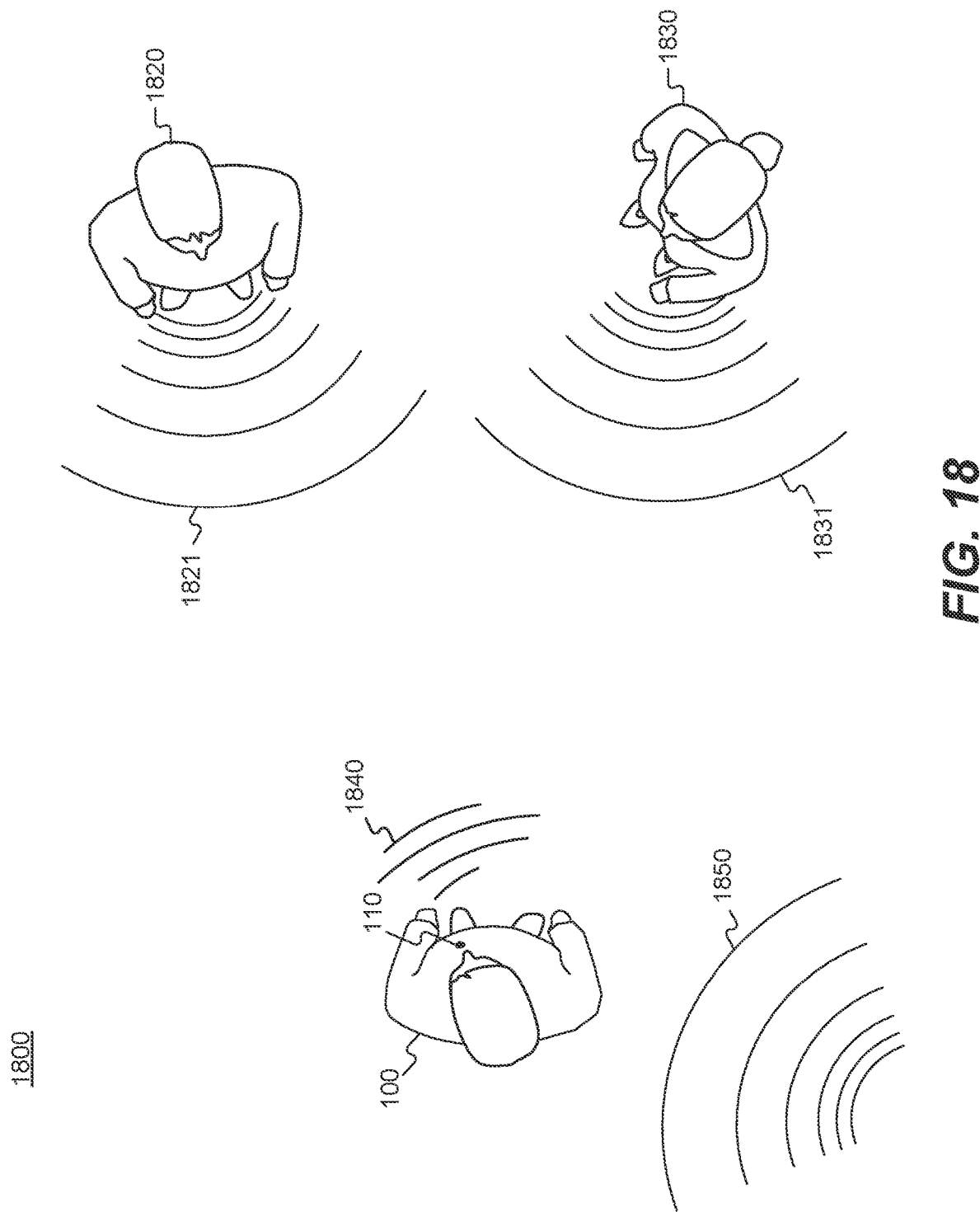
FIG. 18 is a schematic illustration showing an exemplary environment of a user consistent with the present disclosure.

In some embodiments, user 100 may wear a wearable apparatus (e.g., similar to the camera-based hearing aid device discussed above). Consistent with the disclosed embodiments, apparatus 110 may be positioned in various locations associated with user 100, as described previously. For example, apparatus 110 may be physically connected to a shirt, a necklace, a belt, glasses, a wrist strap, a button, etc. FIG. 18 illustrates an exemplary environment 1800 of user 100 consistent with the present disclosure. As illustrated in FIG. 18, environment 1800 may include user 100 wearing wearable apparatus 110, individual 1820, and individual 1830. User 100 may be interacting with one or both of individuals 1820 and 1830, and for example, speaking with one or both of individual 1820 and 1830. Although only two other individuals 1820 and 1830 are illustrated in FIG. 18, it should be understood that environment 1800 may include any number users and/or other individuals.

In some embodiments, the wearable apparatus may include an image sensor configured to capture a plurality of images from an environment of a user of the wearable apparatus. For example, image sensor 220 may be part of a camera included in apparatus 110. It is contemplated that image sensor 220 may be associated with a variety of cameras, for example, a wide angle camera, a narrow angle camera, an IR camera, etc. In some embodiments, the camera may include a video camera. The one or more cameras (including one or more image sensors 220) may be configured to capture images from the surrounding environment of user 100 and output an image signal. For example, the one or more cameras may be configured to capture individual still images or a series of images in the form of a video. The one or more cameras may be configured to generate and output one or more image signals representative of the one or more captured images. In some embodiments, the image signal may include a video signal. For example, when image sensor 220 is associated with a video camera, the video camera may output a video signal representative of a series of images captured as a video image by the video camera.

In some embodiments, the wearable apparatus may include an audio sensor configured to capture an audio signal from the environment of the user. For example, wearable apparatus may comprise an audio sensor 1710. Audio sensor 1710 may be any device capable of capturing sounds from an environment of a user and converting them to one or more audio signals. For example, audio sensor 1710 may comprise a microphone or another sensor (e.g., a pressure sensor, which may encode pressure differences comprising sound) configured to encode sound waves as a digital signal. In one exemplary embodiment, audio sensor 1710 may be embodied in, for example, one or more microphones 443, 444, as described with respect to FIGS. 4F and 4G. Microphones 443 and 444 may be configured to obtain environmental sounds and voices of various speakers communicating with user 100 and output one or more audio signals. Microphones 443, 444 may comprise one or more directional microphones, a microphone array, a multi-port microphone, or the like. The microphones shown in FIGS. 4F and 4G are by way of example only, and any suitable number, configuration, or location of microphones may be used. As shown in FIG. 17A, processor 210 may analyze signals from audio sensor 1710 in addition to signals from image sensor 220.

In some embodiments, the wearable apparatus may include at least one processor. By way of example, as discussed above, apparatus 110 may include processor 210 (see FIG. 5A). As also discussed above, processor 210 may include any physical device having an electric circuit that performs a logic operation on input or inputs. Processor 210 may be configured to control operations of the various components (e.g., camera sensor 220, audio sensor 1710, etc.). For example, processor 210 may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations.

In some embodiments, the at least one processor may be programmed to receive the audio signal captured by the audio sensor. For example, one or more microphones 443, 444 associated with apparatus 110 may capture one or more sounds such as sound 1840 associated with user 100, sound 1821 associated with individual 1820, sound 1831 associated with individual 1830, or other sounds 1850 in environment 1800. Audio sensor 1710 may generate one or more audio signals based on the sounds captured by the one or more microphones 443, 444.

In some embodiments, the at least one processor may be programmed to identify at least one segment of the audio signal. The at least one segment of the audio signal may comprise speech. For example, processor 210 may be configured to analyze the received audio signal and identify portions of the audio signal containing speech (e.g., spoken words or phrases) by a user of wearable apparatus 110 or by one or more other persons present in the environment of the user. By way of example as illustrated in FIG. 18, the audio signal may include one or more segments associated with sounds 1840, 1821, or 1831 that may correspond to speech by, for example, user 100, individual 1820, or individual 1830, respectively.

Figure 19:
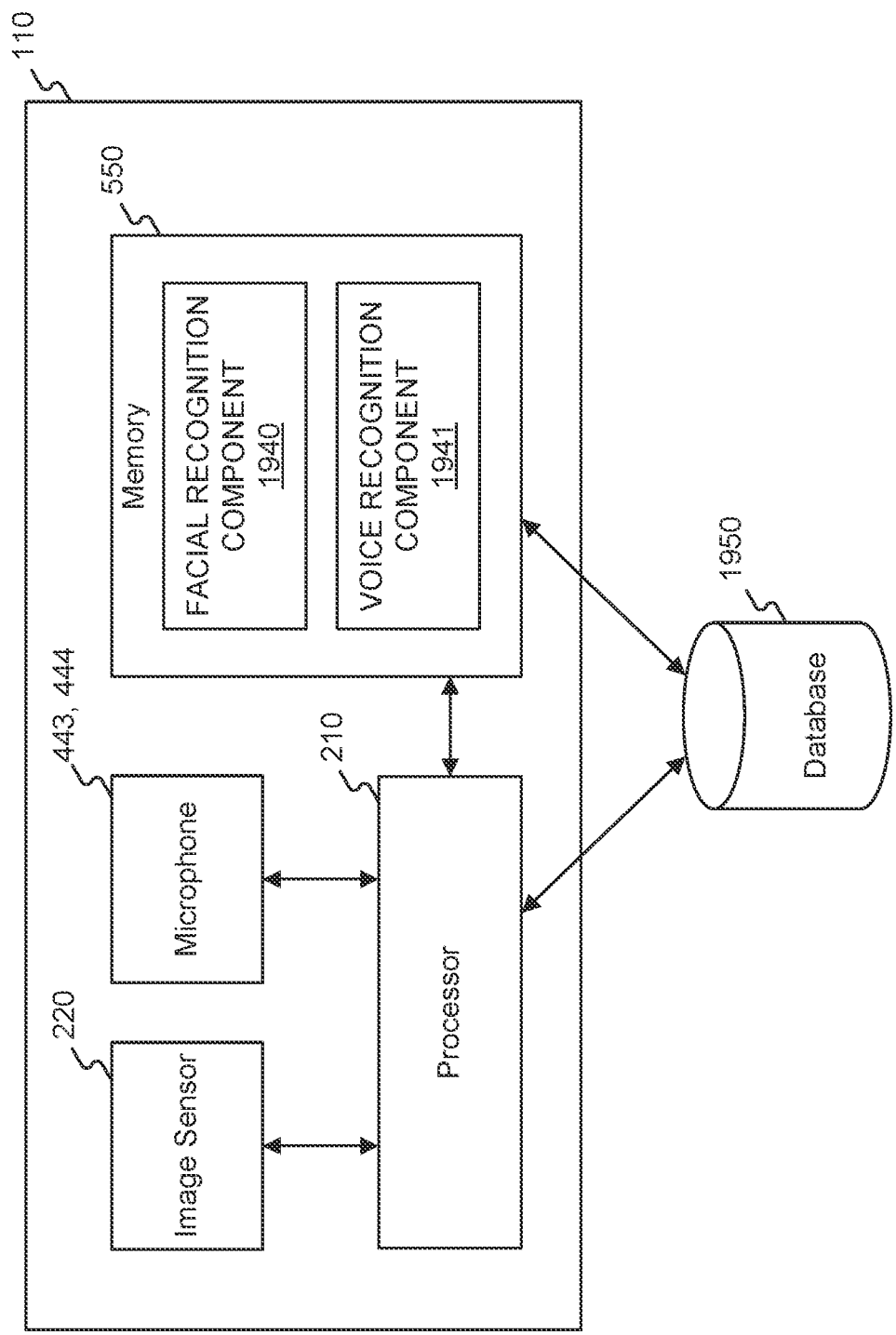
FIG. 19 illustrates an exemplary embodiment of an apparatus comprising facial and voice recognition components consistent with the present disclosure.

FIG. 19 illustrates an exemplary embodiment of apparatus 110 comprising facial and voice recognition components consistent with the present disclosure. Apparatus 110 is shown in FIG. 19 in a simplified form, and apparatus 110 may contain additional elements or may have alternative configurations, for example, as shown in FIGS. 5A-5C. Memory 550 (or 550a or 550b) may include facial recognition component 1940 and voice recognition component 1941. These components may be instead of or in addition to orientation identification module 601, orientation adjustment module 602, and motion tracking module 603 as shown in FIG. 6. Components 1940 and 1941 may contain software instructions for execution by at least one processing device, e.g., processor 210, included with a wearable apparatus. Components 1940 and 1941 are shown within memory 550 by way of example only, and may be located in other locations within the system. For example, components 1940, 1941 may be located in wearable apparatus 110, in computing device 120, on a remote server, or in another associated device.

Voice recognition component 1941 (FIG. 19) may include one or more voice recognition algorithms, such as Hidden Markov Models, Dynamic Time Warping, neural networks, or the like. Voice recognition component 1941 and/or processor 210 may access database 1950, which may further include one or more voiceprints of one or more individuals. The one or more voiceprints in database 1950 may represent audio signals including speech (e.g., spoken words or phrases) of the one or more individuals (e.g., user 100, individual 1820, individual 1830, etc.). Voice recognition component 1941 may analyze the audio signal received by processor 210 to determine one or more segments of the audio signal that match one or more voiceprints of one or more individuals stored in database 1950. When a segment of the audio signal matches the one or more voiceprints stored in database 1950, processor 210 may identify that segment as comprising speech.

In some embodiments, database 1950 may store one or more audio signal characteristics (e.g., frequency or amplitude variations, spacing between signal peaks, sound power, and/or other characteristics) representative of speech by one or more individuals (e.g., user 100, individual 1820, individual 1830, etc.). Processor 210 may extract similar characteristics from one or more segments of the audio signal captured by audio sensor 1710. Processor 210 may compare the extracted characteristics with the one or more characteristics stored in database 1950. When there is a match between the characteristics extracted from a segment of the audio signal and the one or more characteristics stored in database 1950, processor 210 may identify that segment as comprising speech.

In some embodiments, processor 210 may employ one or more trained machine learning models or neural networks to identify one or more segments of the audio signal received by processor 210 as comprising speech. For example, a set of training audio signals together with corresponding labels may be provided to train a machine learning model or a neutral network. One or more segments of the audio signal received by processor 210 may be presented as input to the trained machine learning model or neural network, which may output an indication regarding whether or not the one or more segments of the audio signal comprise speech.

In some embodiments, the above-described process for identifying a segment of the audio signal comprising speech may be used alone, or in conjunction with the voice recognition or facial recognition techniques. For example, lip movements of an individual recognized using facial recognition component 1940 may be compared with a concurrently occurring segment of the audio signal received by processor 210. Processor 210 may identify the segment of the audio signal as comprising speech based on the detected lip movements.

For example, facial recognition component 1940 may be configured to identify one or more faces within the environment of user 100. Facial recognition component 1940 may identify facial features on a face of an individual, such as the eyes, nose, cheekbones, jaw, mouth or other features. Facial recognition component 1940 may include algorithms and instructions associated with one or more image processing techniques to recognize facial features of the user, such as convolutional neural networks (CNN), scale-invariant feature transform (SIFT), histogram of oriented gradients (HOG) features, or other techniques. In some embodiments, processor 210 may be configured to detect one or more points associated with the mouth of an individual. The one or more points may represent one or more characteristic points of an individual's mouth, such as one or more points along the individual's lips or the corner of the individual's mouth. Processor 210 may determine one or more contours of the individual's mouth (e.g., represented by lines or polygons) based on the one or more points or based on the captured image. The contour may represent the entire mouth or may comprise multiple contours, for example including a contour representing an upper lip and a contour representing a lower lip. Each lip may also be represented by multiple contours, such as a contour for the upper edge and a contour for the lower edge of each lip. Processor 210 may further use various other techniques or characteristics, such as color, edge, shape or motion detection algorithms to identify the lips of an individual. The identified lips may be tracked over multiple frames or images. Processor 210 may use one or more video tracking algorithms, such as mean-shift tracking, contour tracking (e.g., a condensation algorithm), or various other techniques. Accordingly, processor 210 may be configured to track movement of the lips of an individual in real time. The tracked lip movement together with concurrently occurring segments of the audio signal received by processor 210 may be used by processor 210 to determine whether those segments comprise speech.

It is also contemplated that in some embodiments, database 1950 may store one or more sets of facial features that may be identified as corresponding to speech by an individual. Processor 210 may be configured to compare the one or more facial features extracted using facial recognition component 1940 with the one or more stored sets of facial features in database 1950. When the extracted facial features match with one or more stored sets of facial features, processor 210 may be configured to identify a concurrently occurring segment of the audio signal as comprising speech. For example, an open mouth occurring together with an "Ah" sound may indicate that the captured face belongs to the current speaker.

In some embodiments, the at least one processor may be programmed to receive an image captured by the image sensor, the image including a representation of a code. By way of example, image sensor 220 associated with wearable apparatus 110 may capture an image from an environment of user 100. For example, user 100 may approach or stand in front of a display or a screen of another computing device or in front of a display on a wall or other object in environment 1800 of user 100. The display may include a picture or an image of a code. Image sensor 220 of wearable apparatus 110, may capture an image of the displayed picture or image. Accordingly, the image captured by image sensor 220 may include a representation of the code included in the displayed picture.

In some embodiments, the code may have embedded or otherwise included therein one of a QR code, a barcode, or an alphanumeric code. FIGS. 20A, 20B, and 20C represent exemplary embodiments of images including representations of a code. For example, FIG. 20A illustrates an image 2010 including a representation of a QR code 2020. Similarly, FIG. 20B illustrates an image 2030 including a representation of a barcode 2040. As another example, FIG. 20C illustrates an image 2050 including a representation of an alphanumeric code 2060.

In some embodiments, the at least one processor may be programmed to analyze the code to determine whether the code is associated with at least one of the user or the wearable apparatus. For example, processor 210 may be configured to execute one or more image processing algorithms to determine whether the image includes QR code 2020 or barcode 2040. As one example, processor 210 may be configured to detect light/dark pixels in the image and determine whether the image includes QR code 2020 and/or barcode 2040 based on the pattern of light/dark pixels. By way of another example, algorithms such as ZXing may be used to detect the presence of QR code 2020 and/or barcode 2040 in an image. After determining that an image (e.g., 2010) includes QR code 2020 and/or barcode 2040, processor 210 may be configured to analyze the code to extract information stored in or encoded in QR code 2020 and/or barcode 2040. By way of example, processor 210 may execute one or more algorithms such as ZXing to extract the information stored in QR code 2020 and/or barcode 2040. In some embodiments, processor 210 may be configured to execute one or more optical character recognition algorithms to extract, for example, alphanumeric code 2060 from image 2050.

In some embodiments, processor 210 may be configured to determine whether one or more items of information extracted from, for example, QR code 2020 and/or barcode 2040, or the alphanumeric code 2060 extracted from image 2050 is associated with user 100. By way of example, information extracted from QR code 2020 and/or barcode 2040 may include information such as a name, an identification number, a username, a password, a personal identification (PIN) code, or the like. When the code in the image is an alphanumeric code, the set of letters and/or numbers forming the alphanumeric code may comprise an item of information. Processor 210 may be configured to determine whether the one or more items of information obtained from, for example, QR code 2020, barcode 2040, or alphanumeric code 2060 match one or more items of identifying information associated with user 100. Identifying information associated with user 100 may include, for example, a name, an identification number, a username, a password, a personal identification (PIN) code, or the like. By way of example, identifying information associated with user 100 may be stored in, for example, database 1950. Processor 210 may be configured to compare the one or more items of information extracted from one or more of QR code 2020, barcode 2040, or alphanumeric code 2060 with the identification information stored in database 1950. Processor 210 may be configured to determine that information extracted from the code is associated with user 100 when one or more items of extracted information matches one or more items of identifying information associated with user 100.

In some embodiments, the at least one processor may be programmed to determine whether the code is associated with the user by determining whether a program or an application executed by the computing platform is associated with the user. By way of example, processor 210 may be configured to determine identifying information associated with an individual who may have caused a program or an application to be executed on a computing platform, for example, on computing device 120. In some embodiments, the computing platform (e.g., computing device 120) may include, for example, a desktop computer, laptop computer, a tablet computer, a smartphone, a smartwatch, or any other type of mobile computing device. It is contemplated that a user may be required to enter identifying information such as a username, an identification number, password, PIN, etc., to initiate or execute a program or an application on computing device 120, which program or application may then generate and display QR code 2020, barcode 2040, or alphanumeric code 2060. It is contemplated that processor 540 associated with computing device 120 may transmit information to processor 210 indicating whether or not the application executed on computing device 120 is associated with user 100.

In some embodiments, the processor may be programmed to determine whether the displayed code is associated with the wearable apparatus by determining whether the code is associated with a program or an application associated with the wearable apparatus. By way of example, processor 210 may be configured to identify information associated with a program or an application being executed by processor 210 on wearable apparatus 110. Such information may include, for example, an identification number, a version number, a license key, an installation date or time, or the like, associated with the program or application being executed by processor 210 on wearable apparatus 110. Processor 210 may be configured to compare the information associated with the program or application being executed on wearable apparatus 110 with one or more items of information extracted from, for example QR code 2020, barcode 2040, or alphanumeric code 2060. Processor 210 may determine that QR code 2020, barcode 2040, or alphanumeric code 2060 is associated with the program or application being executed on wearable apparatus 110 when the one or more items of information extracted from QR code 2020, barcode 2040, or alphanumeric code 2060 matches information associated with the program or application being executed on wearable apparatus 110.

In some embodiments, after determining that the code is associated with the user or the wearable apparatus, the at least one processor may be programmed to transmit at least one of the at least one segment of the audio signal, at least one image of the plurality of images, text, or other information to a computing platform. By way of example, when processor 210 has determined that, for example, QR code 2020, barcode 2040, or numeric code 2060 is associated with user 100 and/or with wearable apparatus 110, processor 210 may transmit one or more segments of the audio signal captured by audio sensor 1710, one or more images captured by image sensor 220, text, and/or one or more items of other information to a computing platform (e.g., computing device 120). For example, processor 210 may transmit to the computing platform one or more segments of the audio signal that processor 210 identified as including speech of one or more of user 100, individual 1820, individual 1830, etc.

In some embodiments, the at least one processor may be programmed to derive the other information based on the audio signal, the at least one image, or both. For example, processor 210 may be configured to determine an identity of an individual (e.g., individual 1820 or 1830) associated with one or more segments of the audio signal comprising speech and include the identity in the other information transmitted to the computing platform (e.g., computing device 120). It is also contemplated that in some embodiments, processor 210 may be configured to determine an identity of an individual represented in one or more images obtained by image sensor 220. Processor 210 may also be programmed to transmit the identity of the individual in association with an image including a representation of that individual as an item of other information to the computing platform (e.g., computing device 120). It is further contemplated that the one or more items of information may include without limitation any other type of information, such as, information regarding prior interactions of user 100 with the one or more identified individuals, contact information of the one or more identified individuals, and/or any other type of information obtained, for example, from social media platforms with which the one or more identified individuals may be associated.

In some embodiments, the one or more items of other information may include, for example, a transcription of at least one segment of the audio signal comprising speech. For example, in some embodiments, the at least one processor may be programmed to transcribe at least one segment of the audio signal into text. As discussed above, processor 210 may be configured to identify one or more segments of the audio signal that may include speech associated with user 100 or one or more other individuals (e.g., individual 1820 or 1830) in environment 1800 of user 100. Processor 210 may be configured transcribe the identified one or more segments of the audio signal into text.

In some embodiments, the at least one processor may be programmed to transcribe at least a portion of speech associated with at least one identified voice in the audio signal. For example, the at least one processor may be programmed to determine an identity of an individual associated with the at least one segment of the audio signal. Processor 210 may be programmed to distinguish and identify voices of one or more speakers (e.g., user 100, individual 1820 or 1830, etc.) in the audio signal received from environment 1800 using voice recognition component 1940 (FIG. 18). For example, processor 210 may use one or more voice recognition algorithms, such as Hidden Markov Models, Dynamic Time Warping, neural networks, or other techniques to identify the voices. Voice recognition component 1940 and/or processor 210 may access database 1950, which may include voiceprints of user 100 and/or one or more other individuals (e.g., individual 1820, 1830, etc.). Voice recognition component 1940 may analyze the audio signal to determine whether one or more segments of the audio signal match one or more voiceprints stored in database 1950. Accordingly, database 1950 may contain voiceprint data associated with a number of individuals (e.g., user 100, individual 1820 or 1830, etc.). When processor 210 determines a match between, for example, one or more segments of the audio signal and one or more voiceprints stored in database 1950, processor 210 may identify the one or more segments as belonging to individuals associated with respective matching one or more voiceprints.

Having a speaker's voiceprint, and a high-quality voiceprint in particular, may provide for fast and efficient way of determining an identity of an individual associated with the at least one portion of the audio signal. A high-quality voice print may be collected, for example, when user 100, or another individual (e.g., individual 1820, 1830, etc.) speaks alone, preferably in a quiet environment. By having a voiceprint of one or more speakers, it may be possible to separate voices in the audio signal almost in real time, e.g., with a minimal delay, using a sliding time window. The delay may be, for example 10 ms, 20 ms, 30 ms, 50 ms, 100 ms, or the like. Different time windows may be selected, depending on the quality of the voice print, on the quality of the captured audio, the difference in characteristics between speaker(s), the available processing resources, the required separation quality, or the like. In some embodiments, a voice print may be extracted from a segment of a conversation in which an individual (e.g., user 100, individual 1820, 1830, etc.) speaks alone, and then used for separating the individual's voice from an audio signal.

In some embodiments, separating voices may be performed as follows: spectral features, also referred to as spectral attributes, a spectral envelope, or a spectrogram may be extracted from a clean audio of a single speaker and fed into a pre-trained first neural network, which may generate or update a signature of the speaker's voice based on the extracted features. It will be appreciated that the voice signature may be generated using any other engine or algorithm, and is not limited to a neural network. The audio may be for example, of one second of a clean voice. The output signature may be a vector representing the speaker's voice, such that the distance between the vector and another vector extracted from the voice of the same speaker is typically smaller than the distance between the vector and a vector extracted from the voice of another speaker. The speaker's model may be pre-generated from a captured audio. Alternatively or additionally, the model may be generated after a segment of the audio in which only the speaker speaks, followed by another segment in which the speaker and another speaker (or background noise) is heard, and which it is required to separate.

Then, to separate the speaker's voice from additional speakers or background noise in a noisy audio, a second pre-trained engine, such as a neural network may receive the noisy audio and the speaker's signature, and output an audio (which may also be represented as attributes) of the voice of the speaker as extracted from the noisy audio, separated from the other speech or background noise. It will be appreciated that the same or additional neural networks may be used to separate the voices of multiple speakers. For example, if there are two possible speakers, two neural networks may be activated, each with models of the same noisy output and one of the two speakers. Alternatively, a neural network may receive voice signatures of two or more speakers, and output the voice of each of the speakers separately. Accordingly, the system may generate two or more different audio outputs, each comprising the speech of a respective speaker. In some embodiments, if separation is impossible, the input voice may only be cleaned from background noise.

In some embodiments, identifying the first voice may comprise at least one of matching the first voice to a known voice or assigning an identity to the first voice. For example, processor 210 may use one or more of the methods discussed above to identify one or more voices in the audio signal by matching the one or more voices represented in the audio signal with known voices (e.g., by matching with voiceprints stored in, for example, database 1950). It is also contemplated that additionally or alternatively, processor 210 may assign an identity to each identified voice. For example, database 1950 may store the one or more voiceprints in association with identification information for the speakers associated with the stored voiceprints. The identity may include, for example, a name of the speaker, or another identifier (e.g., number, employee number, badge number, customer number, a telephone number, an image, any combination of the foregoing examples, or any other representation of an identifier that associates a voiceprint with a speaker).

Processor 210 may also be configured to transcribe some or all of the speech associated with an identified speaker (e.g., user 100, individual 1820 or 1830, etc.). As discussed above, the one or more microphones 443, 444, or 1720 may generate an audio signal corresponding to voices of user 100 and/or one or more individuals (e.g., individual 1820 or 1830, etc.). Processor 210 may be configured to initially identify the voices of one or more of user 100 and/or one or more individuals (e.g., individual 1820 or 1830, etc.) in environment 1800 of user 100. Processor 210 may further be configured to transcribe some or all of the speech associated with one or more of the identified voices. For example, after identifying that a segment of the audio signal corresponds to a voice of an individual, processor 210 may transcribe some or all of that segment of the audio signal.

Processor 210 may be configured to transcribe a segment of the audio signal using various speech-to-text algorithms. Processor 210 may be configured to execute one or more sound recognition modules in voice recognition component 1941 to transcribe some or all of the segment of the audio signal. In some embodiments, the one or more sound processing modules may allow processor 210 to convert one or more spoken words to text, using any known speech-to-text process or technology. It is contemplated that processor 210 may be configured to store the transcribed text in, for example, database 1950 or in any other storage device associated with processor 210. In some embodiments, transcribing audio by a particular speaker may utilize a voice print or a specific model associated with the speaker.

In some embodiments, the at least one processor may be programmed to separate the voices and transcribe one or more segments of the at least one audio signal into the text using analysis of one or more images. For example, processor 210 may analyze one or more images obtained by image sensor 220 to identify one or more mouth gestures for determining one or more spoken phonemes, syllables or words. Processor 210 may be configured to identify the one or more mouth gestures by, for example, tracking a movement of lips as described above. Processor 210 may use one or more video tracking algorithms, such as mean-shift tracking, contour tracking (e.g., a condensation algorithm), or various other techniques to track the movement of lips. Processor 210 may also be configured to determine one or more mouth gestures based on a shape and/or variation of the shape of the lips over time. Processor 210 may be configured to determine a spoken word based on the one or more mouth gestures based on one or more rules. For example, processor 210 may access one or more rules specifying one or more relationships between identified mouth gestures and spoken words. Processor 210 may be configured to determine the spoken word or words for transcription based on the one or more rules, which may be stored, for example, in database 1950.

In some embodiments, the mouth gestures may be used to ascertain the speaker within an audio segment.

It is also contemplated that in some embodiments, processor 210 may be configured to determine the one or more spoken words using a machine learning algorithm or neural network that may be trained using training examples. Examples of such models may include support vector machines, Fisher's linear discriminant, nearest neighbor, k nearest neighbors, decision trees, random forests, and so forth. By way of example, a set of training examples may include a plurality of images showing one or more mouth gestures associated with identified spoken phonemes, syllables, or words. For example, the training examples may include image, or image sequence samples including one or more words spoken by a plurality of speakers. It is contemplated that the machine learning algorithm or neural network may be trained to identify one or more spoken phonemes, syllables, or words from captured images based on these and/or other training examples. It is further contemplated that the trained machine learning algorithm or neural network may be configured to output text corresponding to the one or more spoken words when presented with one or more images of mouth gestures as inputs. It is also contemplated that a trained neural network for identifying one or more words may be a separate and distinct neural network or may be an integral part of one or more other neural networks discussed above.

In some embodiments, the at least one processor may be programmed to include the transcribed text in the other information. In some embodiments, the at least one processor may be programmed to include the determined identity in association with the transcribed text in the other information. In some embodiments, the at least one processor may also be programmed to transmit the other information including the transcribed text and/or the identity associated with the transcribed text to the computing platform (e.g., computing device 120). As will be described in more detail below, processor 210 may be configured to transmit the transcribed text and/or an identity of an individual associated with the transcribed text to the computing platform via wired or wireless communication techniques.

In some embodiments, the at least one processor may be programmed to determine an identity of an individual based on at least one image of the plurality of images. As discussed above, processor 210 may be configured to receive one or more image signals representative of one or more images captured by image sensor 220 from environment 1800 of user 100. By way of example, processor 210 may execute one or more instructions or algorithms stored in facial recognition component 1940 to identify one or more individuals (e.g., 1820, 1830, etc.) in the one or more images captured by image sensor 220. As discussed above processor 210 may execute facial recognition component 1940 to identify one or more facial features of one or more individuals (e.g., 1820, 1830, etc.) represented in the one or more images received from image sensor 220. Facial recognition component 1940 may utilize one or more algorithms for analyzing the detected features, such as principal component analysis (e.g., using eigenfaces), linear discriminant analysis, elastic bunch graph matching (e.g., using Fisherface), Local Binary Patterns Histograms (LBPH), Scale Invariant Feature Transform (SIFT), Speed Up Robust Features (SURF), or the like.

Facial recognition component 1940 may access a database to determine if the detected facial features correspond to a recognized individual (e.g., 1820, 1830, etc.). For example, processor 210 may access database 1950 containing information about individuals known to user 100 and data representing associated facial features or other identifying features. Other data or information may also inform the facial identification process. In some embodiments, processor 210 may determine a user look direction, which may be used to verify the identity of individual 1820, 1830, etc. For example, if user 100 is looking in the direction of an individual (especially for a prolonged period, e.g., a time period that equals or exceeds a predetermined threshold of time such as for example, 5 seconds or more, 10 seconds or more, 20 seconds or more, etc.), this may indicate that the individual (e.g., individual 1820, 1830, etc.) is recognized by user 100, which may be used to increase the confidence of facial recognition component 1940 or other identification means.

In some embodiments, the at least one processor may be programmed to include the identity of the individual in association with the at least one image in the other information, and transmit the other information to the computing platform. For example, processor 210 may include a name, an identifier, and/or contact information, etc., of an identified individual (e.g., individual 1820, 1830, etc.) in association with an image including a representation of the identified individual in the one or more items of information transmitted to a computing platform (e.g., computing device 120).

It is also contemplated that in some embodiments, the at least one processor may be programmed to derive the other information based on the audio signal, the at least one image, or both. For example, as discussed above, processor 210 may be configured to determine other information (e.g., identity of an individual speaker, transcription of a segment of the audio signal associated with the identified speaker, etc.) based on the audio signal captured by audio sensor 1710. In other embodiments, processor 210 may be configured to determine other information (e.g., identity of an individual speaker, transcription of a segment of the audio signal associated with the identified speaker, etc.) based on one or more images captured by image sensor 220. It is further contemplated that in some embodiments, processor 210 may use one or more of the techniques described above to identify a speaker based on both recognizing voices in the audio signal and based on recognizing an individual in an image obtained from environment 1800 of user 100. Processor 210 may also include the identity and/or transcription determined based on both the audio signal and the one or more images in the other information transmitted to a computing platform such as computing device 120.

In some embodiments, a system may include wearable apparatus 110 and/or other computing devices such as computing device 120, server 250, etc., that may cooperate with each other to provide a transcription or summary of an interaction of user 100 with one or more individual 1820, 1830, etc., in environment 1800. In some embodiments, the disclosed system may include an image sensor configured to capture a plurality of images from an environment of a user; and an audio sensor configured to capture an audio signal from the environment of the user. For example, as discussed above, the disclosed system may include image sensor 220 and/or audio sensor 1710. In some embodiments, the disclosed system may include a first processor and a second processor. In some embodiments, the image sensor, the audio sensor, and the first processor may be included in a wearable apparatus. For example, the disclosed system may include wearable apparatus similar to apparatus 110 and a computing device (e.g., computing device 120, server 250, etc.) User 100 may wear apparatus 110, which may be equipped with processor 210, image sensor 220, and audio sensor 1710. Processor 210 may be the first processor of the disclosed system.

In some embodiments, the second processor may be included in a secondary device. In some embodiments, the secondary device may be the computing platform. By way of example a secondary device such as computing device 120 may include the second processor (e.g., processor 540). It is contemplated that in some embodiments, processor 210 of wearable apparatus 110 may be programmed to transmit one or more segments of the audio signal, a transcription of at least one segment of the audio signal, an image, or one or more items of other information to computing device 120.

Figure 21:
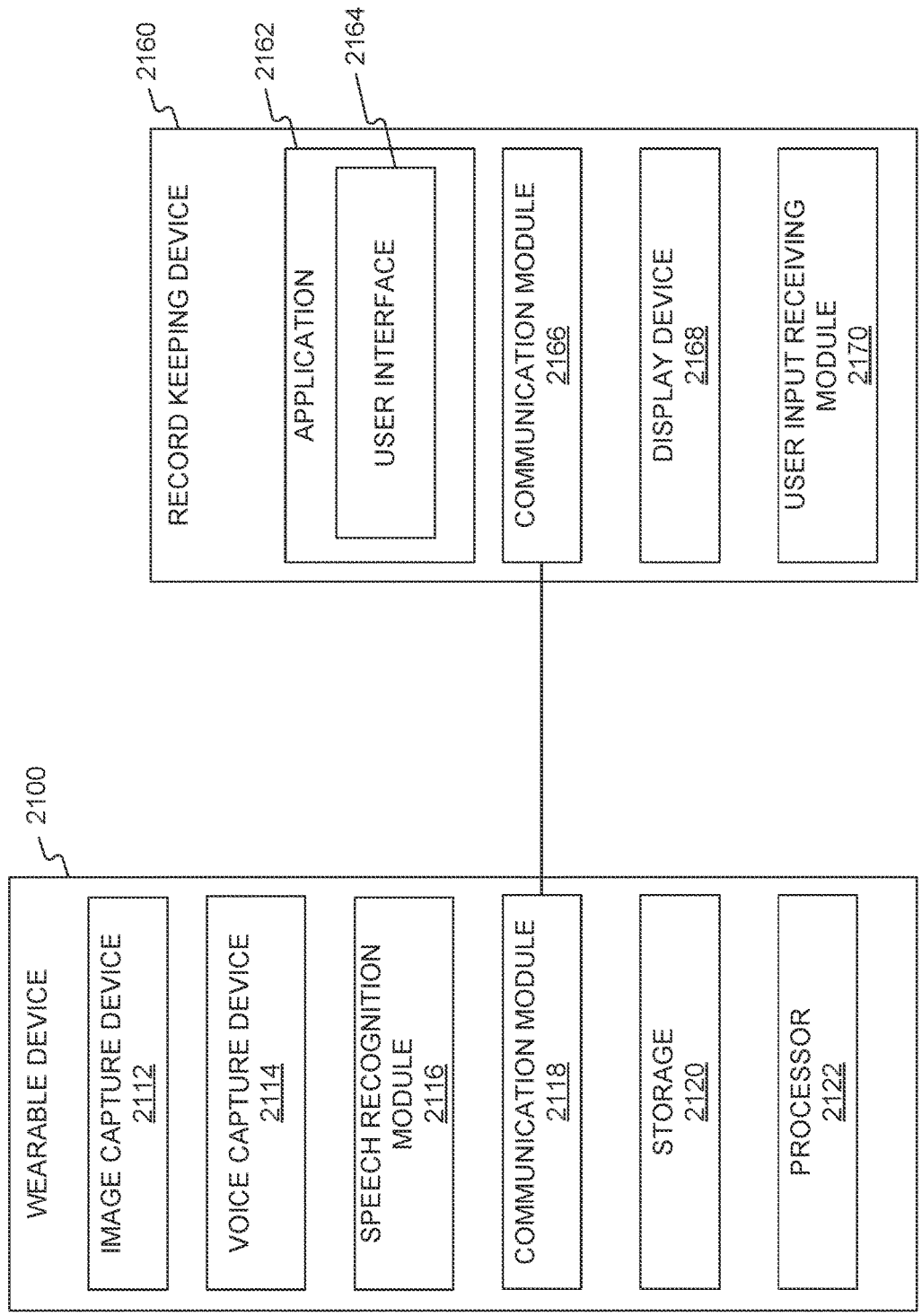
FIG. 21 illustrates a generalized block diagram of the entities for practicing the disclosed systems and methods, consistent with the disclosed embodiments.

FIG. 21 illustrates an exemplary generalized block diagram of entities for practicing the disclosed systems and methods of processing audio and video signals. For example, the disclosed entities may include wearable device 2100, which may be similar to apparatus 110. Device 2100 may include image capture device 2112 voice capture device 2114, which may be similar to audio sensor 1720 of apparatus 110. Device 2100 may also include speech recognition module 2116 configured to recognize spoken words within audio captured by, for example, voice capture device 2712. In one exemplary embodiment, speech recognition module 2116 may include one or more instructions, neural networks, and/or machine learning algorithms, which when executed by processor 210 may allow processor 210 to recognize spoken words within the captured audio signal. As discussed above, processor 210 may be programmed to execute the instructions in speech recognition module 2116 to distinguish voices of different speakers and to associate each word or sequence of words with a speaker (e.g., user 100 or another individual 1820, 1830, etc.).

Although image capture device 2112, voice capture device 2114, and speech recognition module 2116 have been described above as including instructions executable by processor 210, these components of device 2100 are not limited to software instructions. For example, one or more of image capture device 2112, voice capture device 2114, and speech recognition module 2116 may be implemented as a hardware module capable of performing the functions described above. By way of example, one or more of image capture device 2112, voice capture device 2114, and speech recognition module 2116 may be implemented as Application Specific Integrated Circuits (ASICs) or other electronic circuitry capable of performing the functions described above. Processor 210 may be programmed to cause the hardware and/or software associated with image capture device 2112, voice capture device 2114, and speech recognition module 2116 to perform their respective functions.

In some embodiments, computing device 120 may be in the form of device 2160, which may be equipped with a processor 540 (e.g., second processor). As also discussed above, the secondary device (e.g., computing device 120 or device 2160) may include one or more of a desktop computers, laptop computer, a tablet computer, a smartphone, a smartwatch, or any other type of mobile device.

Device 2100 may include communication module 2118 configured to communicate with another device, for example, device 2160. Communication module 2118 may include one or more transceivers (e.g., wireless transceiver 530). It is contemplated that communication module 2118 may communicate with device 2160 via wired or wireless communication channels. Wireless transceiver 530 may use any known standard to transmit and/or receive data (e.g., Wi-Fi, Bluetooth®, Bluetooth Smart, 802.15.4, or ZigBee).

Device 2100 may also include storage 2120 that may be similar to memory 550 and/or database 1950. Storage 2120 may be configured to store one or more audio signals received from audio sensor 220, one or more images received from image sensor 1710, and/or fully or partially transcribed text generated by processor 210 from a received audio signal. Storage 2120 may additionally or alternatively be configured to store one or more items of additional information (e.g., identity of an individual, etc.). It is also contemplated that in some embodiments, the information stored in storage 2120 may additionally or alternatively be stored in a storage device external to wearable apparatus 2100, for example, in database 1950. Further, device 2100 may include processor 2122, which may be similar to processor 210.

Device 2160 may include a record keeping device that may be used by, for example, user 100 to prepare a document, report, or to fill out a fillable form. In some embodiments, device 2160 may include one of a tablet computer, a smartphone, a smartwatch, a laptop computer, or a desktop computer, etc. Device 2160 may include application 2162 for preparing documents or reports. Application 2162 may be a program or application (e.g., an app) used by, for example, physicians or other caregivers for handling patient data, including, for example, documenting a summary of a meeting with the patient. However, use of device 2160 and application 2162 in other settings (e.g., office or social settings) is also contemplated. In some embodiments, application 2162 may include one or more instructions that when executed by a processor (e.g., processor 540) may cause display device 2168 of device 2660 to display user interface 2164 that may include a document, fillable form or report, a record for entry of information.

Device 2160 may include communication module 2166, which may be similar to communication module 2118 of wearable device 2100. Communication module 2166 may include one or more transceivers (e.g., wireless transceiver 530). It is contemplated that communication module 2166 may communicate with wearable device 2100 via wired or wireless communication channels using any known standard to transmit and/or receive data (e.g., Wi-Fi, Bluetooth®, Bluetooth Smart, 802.15.4, or ZigBee). By way of example, communication module 2166 of device 2160 may transmit inputs provided by user 100 on device 2160 to wearable device 2100.

Device 2160 may include display device 2168 that may include one or more of a cathode ray tube, a liquid crystal display, a light emitting diode display, a touchscreen display, or any other type of display device. Display device 2168 may be configured to display one or more images including a representation of a code (e.g., QR code 2020, barcode 2040, or alphanumeric code 2060). Display device 2168 may also be configured to display user interface 2164 including the document, report, Tillable form, and/or fields or records for entry of information.

Device 2160 may include user input receiving module 2170 for receiving user inputs. User input receiving module 2170 may include instructions, which when executed by a processor of device 2116 may allow a user of device 2160 (e.g., user 100) to provide inputs such as entered text, selections of one or more icons, or the like, as will be described below.

It is contemplated that one or more of communication module 2166 and user selection input module 2170 may be implemented as part of application 2162. It is also contemplated that in some embodiments, one or more of speech recognition module 2116, and/or storage 2120 may additionally or alternatively be implemented on device 2160.

Although application 2162 has been described above as including instructions executable by a processor of device 2160, application 2162 is not limited to software instructions. For example, application 2162 may be implemented as a hardware module capable of performing the functions described above. By way of example, application 2162 may be implemented as an ASIC or via other electronic circuitry. A processor associated with device 2160 may be configured to cause the hardware and/or software associated with application 2162 to perform its function.

In some embodiments, the first processor may be programmed to receive the audio signal captured by the audio sensor; identify at least one segment of the audio signal, the at least one segment comprising speech; receive an image captured by the image sensor, the image including a representation of a code; analyze the code to determine whether the code is associated with at least one of the user or a device associated with the first processor; and after determining that the code is associated with the user or the device associated with the first processor, transmit at least one of a transcription of the at least one segment of the audio signal, at least one image of the plurality of images, or other information to a computing platform. For example, as discussed above wearable apparatus 110 may include first processor 210 that may perform one or more of these functions. In some embodiments, the second processor may be programmed to display the image representing the code on a display device, wherein the display device is located in the environment of the user. By way of example, secondary device 2160 may include processor 540, which may be the second processor of the disclosed system. Processor 540 may execute instructions associated with application 2162 to display an image, for example, image 2010, 2030, 2050, etc., on display device 2168 of device 2160. As discussed above, image 2010, 2030, 2050 may include a representation of a QR code 2020, barcode 2040, or alphanumeric code 2060, respectively. As also discussed above, image sensor 220 of wearable apparatus 110 may be configured to capture an image of one or more of the images 2010, 2030, 2050 displayed on display device 2168 of device 2160.

Processor 210 of wearable apparatus 110 may analyze QR code 2020, barcode 2040, or alphanumeric code 2060 represented in images 2010, 2030, 2050, respectively, to determine whether the code is associated with at least one of user 100 or a wearable apparatus 110 associated with first processor 210. In some embodiments, the code may include a link, and the first processor may be programmed to access the link to receive information about the user. By way of example, QR code 2020, barcode 2040, or alphanumeric code 2060 may include a link such as a Universal Resource Locator or URL. Processor 210 of wearable apparatus 110 may access the link (e.g., URL) to retrieve information such as, a name, a username, and identifying number, a password, or any other item of information associated with user 100. It is also contemplated that in some embodiments, processor 210 may access the link to retrieve information associated with an application or program being executed by wearable apparatus 110. Information associated with the application or program may include, for example, a name or identifier of a person who may have initiated the application or program, a version number, and identifier (e.g., application or program number), a license key, install date/time, or any other information associated with the application or program. Processor 210 may use the information obtained, for example, from the link to determine whether the code is associated with user 100 or with a program or application being executed by wearable apparatus 110 using one or more of the techniques discussed above. When processor 210 determines that the code is associated with at least one of user 100 or a wearable apparatus 110, processor 210 may transmit one or more segments of an audio signal, one or more images, and/or one or more items of other information to device 2160.

Figure 22A:
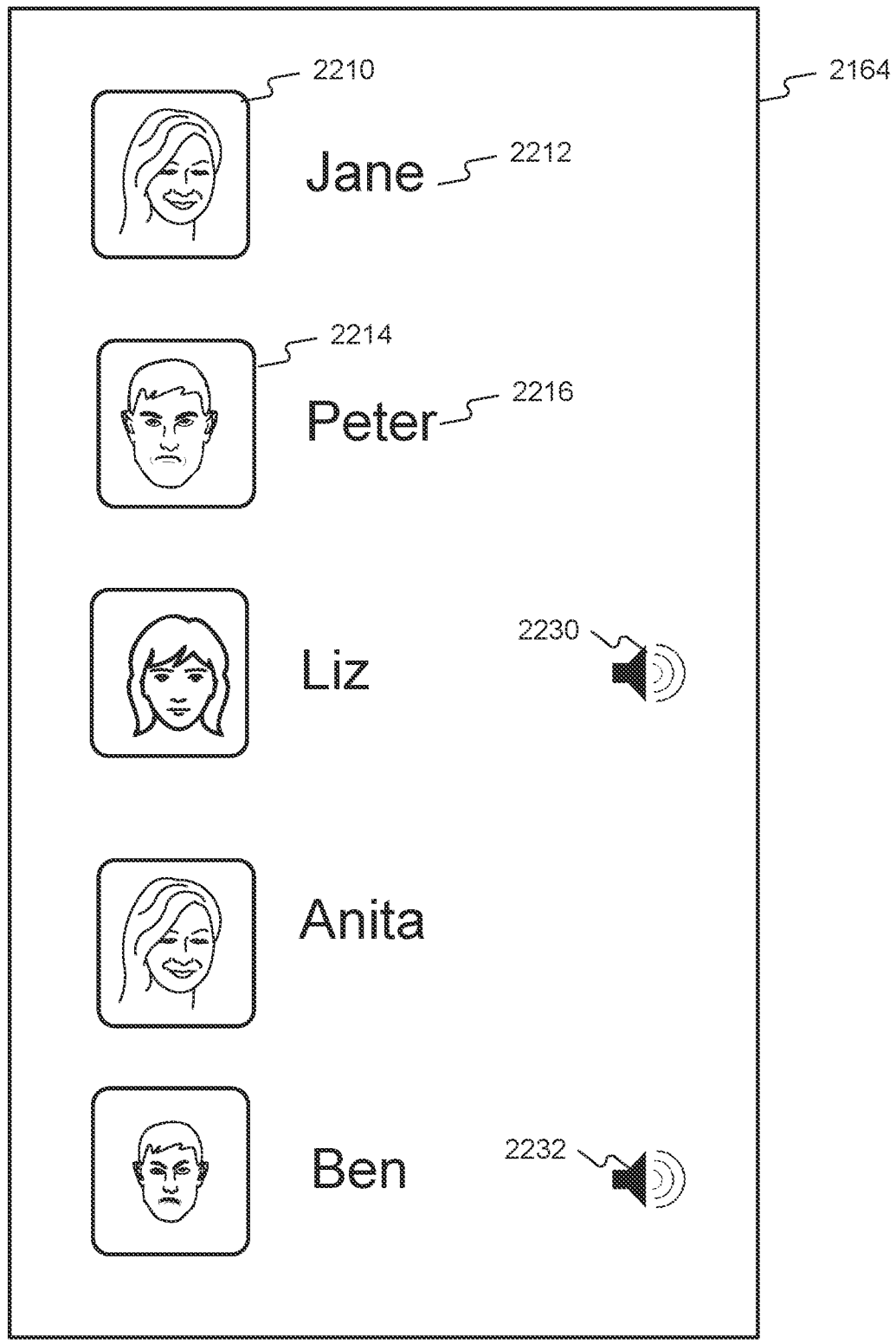
FIG. 22A illustrates an exemplary display of information consistent with the present disclosure.

In some embodiments, the second processor may be programmed to display at least a portion of at least one of the plurality of images or the information on the display device. As discussed above, in some embodiments, processor 210 (e.g., first processor) of wearable apparatus 110 may transmit one or more of the plurality of images captured by, for example, image sensor 220 of wearable apparatus 110, to device 2160. In some embodiments, the second processor may be programmed to display at least one of the plurality of images and an identity of at least one individual associated with the at least one of the plurality of images on the display device. For example, as discussed above, processor 210 of wearable apparatus 110 may be programmed to recognize one or more individuals in the one or more images captured by image sensor 220. Processor 220 may also be programmed to transmit identities of the one or more recognized individuals in association with their respective images as one or more items of other information to device 2160. Processor 540 (e.g., second processor) of device 2160 may be programmed to render for display some or all of the images of the recognized individuals received from wearable apparatus 110 on display device 2168 of device 2160. For example, as illustrated in FIG. 22A, processor 540 of device 2160 may display user interface 2164 on display device 2168. As also illustrated in FIG. 22A, processor 540 of device 2160 may display image 2210 of an individual along with identity 2212 (e.g., Jane), image 2214 of an individual and the associated identity 2216 (e.g., Peter), or the like, on user interface 2164. Any number of images 2210, 2214, etc., and associated identities 2212, 2216, etc., may be displayed on display device 2168 via, for example, user interface 2164. Although only an identity (e.g., name) of an individual associated with an image of that individual is illustrated in FIG. 22A, it is contemplated that other information, for example, telephone number, address, email address, or other information associated with an individual may be displayed on user interface 2164. The image may be an image captured by image capture device 2112, or a predefined image stored in storage 2120 and associated with the individual.

In some embodiments, the second processor may be further programmed to display an icon on the display device, wherein the icon is associated with the at least one segment of the audio signal. For example, as discussed above, in some embodiments, processor 210 of wearable apparatus 110 may be programmed to transmit at least a segment of an audio signal captured by audio sensor 1710 to a computing platform (e.g., computing device 120 or device 2160). Processor 540 of device 2160 may receive the segment of the audio signal transmitted by wearable apparatus 110. In one exemplary embodiment, processor 540 of device 2160 may display an icon on user interface 2164 displayed on display device 2168. For example, as illustrated in FIG. 22A, processor 540 may display icon 2230 representative of a segment of an audio signal associated with an individual Liz on user interface 2164. As another example, as illustrated in FIG. 22A, processor 540 may display icon 2232 representative of a segment of an audio signal associated with an individual Ben.

In some embodiments, the second processor may be programmed to receive an input comprising a selection of the icon, and after receiving the input, play the at least one segment of the audio signal. For example, the processor 540 of device 2160 may be programmed to receive an input from a user of device 2160 via user input receiving module 2170. By way of example, after displaying the one or more icons 2230, 2232, etc., on display device 2168 of device 2160, processor 540 may cause user input receiving module 2170 to monitor one or more input devices (e.g., keyboards, touchscreens, touchpads, microphones, etc.) associated with device 2160. User input receiving module 2170 may monitor these input devices for an input or signal indicating that a user (e.g., user 100) of device 2160 has selected, for example, icon 2230 or 2230 out of the one or more icons displayed on display device 2168. For example, user 100 may select icon 2230 or 2230 by clicking on icon 2230 or 2230, selecting a checkbox next to icon 2230 or 2230, pressing a button next to icon 2230 or 2230, or the like. Processor 540 of device 2160 may be programmed to receive a signal indicative of the user input. After receiving the signal, processor 540 may be programmed to play an audio file associated with the selected icon 2230 or 2230 via, for example, a speaker or headphones, etc., associated with device 2160. It is also contemplated that device 2160 may transmit the audio file associated with the selected icon 2230 or 2230 via wired or wireless connections to feedback outputting unit 230, or to a remote speaker or audio device for playing the audio file.

In some embodiments, the first processor may be programmed to transcribe at least a portion of the audio signal into text. For example, as discussed above, processor 210 of wearable apparatus 110 may be programmed to identify one or more segments of an audio signal captured by audio sensor 1710 as comprising speech. As also discussed above, processor 210 may be programmed to execute, for example, one or more speech-to-text algorithms, machine learning algorithms, and/or neural networks to transcribe the one or more segments of the audio signal into text.

In some embodiments, the second processor may be programmed to transcribe at least a portion of the audio signal into text. For example, although the above disclosure describes processor 210 as being programmed to transcribe the one or more segments of the audio signal captured by audio sensor 1710 into text, it is contemplated that in some embodiments, a processor of the computing platform (e.g., computing device 120, or device 2160) may be programmed to transcribe the one or more segments of the audio signal into text. For example, in some embodiments, processor 210 of wearable apparatus 110 may be programmed to transmit the one or more segments of the audio signal to device 2160 via wired or wireless connection. Processor 540 of device 2160 may receive the one or more segments of the audio signal. Processor 540 of device 2160 may also be programmed to transcribe the one or more segments into text by executing one or more speech-to-text algorithms, machine learning algorithms, neural networks, and/or other techniques for transcribing speech to text similar to those described above with respect to processor 210.

Figure 22B:
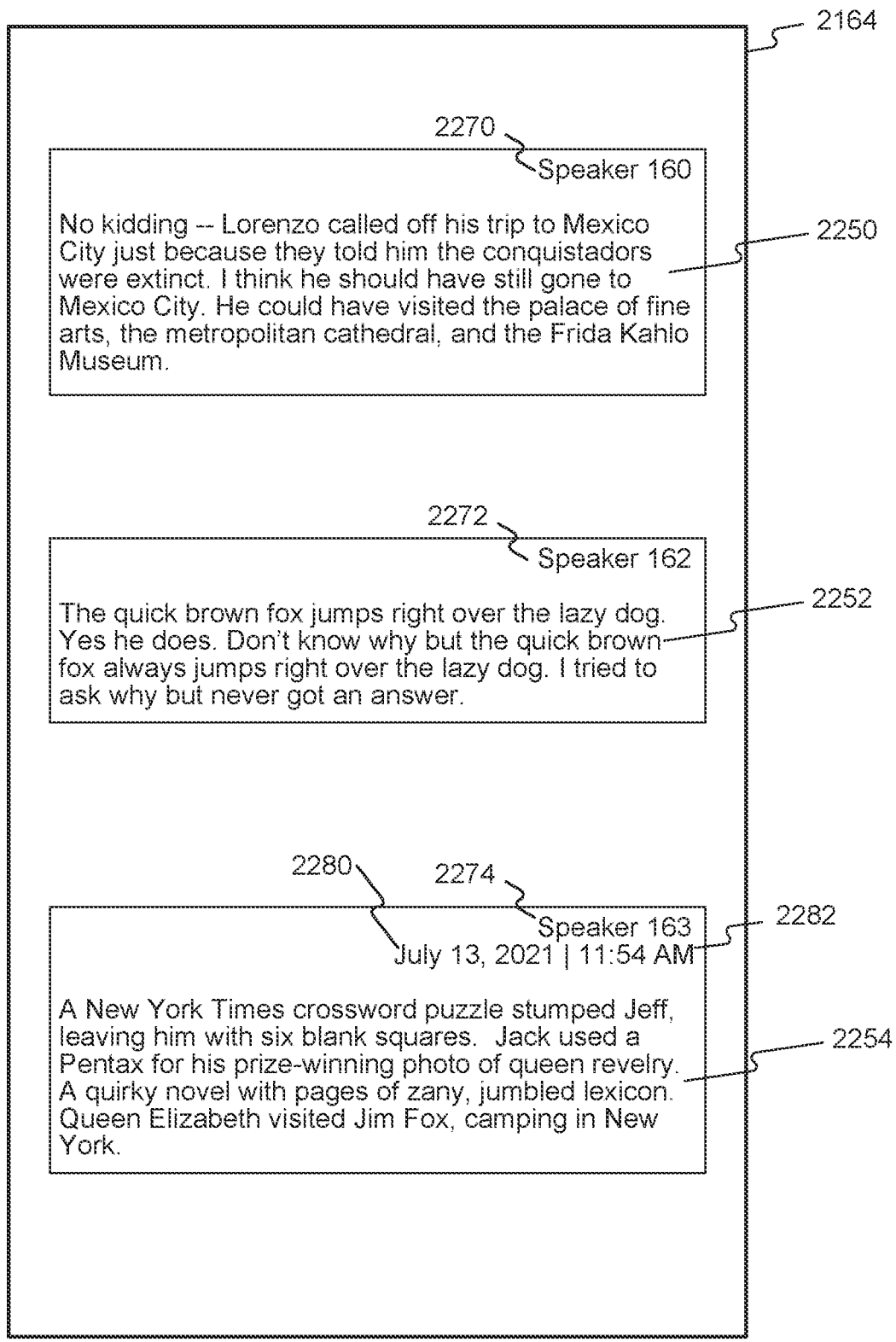
FIG. 22B illustrates another exemplary display of information consistent with the present disclosure.

In some embodiments, the second processor may be programmed to display the transcribed text on the display device. In some embodiments, the second processor may be further programmed to provide the transcribed text to a predetermined application or program being executed by the second processor. By way of example, processor 540 (e.g., second processor) of device 2160 may be programmed to execute one or more instructions associated with application 2162 to display a user interface 2164 on display device 2168 of device 2160. It is also contemplated that in some embodiments, processor 540 may insert the transcribed text corresponding to the one or more segments of the audio signal into user interface 2164. For example, as illustrated in FIG. 22B, processor 540 may be programmed to display user interface 2164 on display device 2168. As also illustrated in FIG. 22B, processor 540 may be programmed to display, for example, text 2250, text 2252, text 2254, etc., corresponding to the one or more segments of the audio signal comprising speech of, for example, speaker 160, speaker 162, speaker 163, respectively. For example, speakers 160, 162, 163 may be present in environment 1800 of user 100. Audio sensor 1710 of wearable apparatus 110 may capture an audio signal including segments corresponding to the speech of speakers 160, 162, 163. Processor 210 of wearable apparatus 110 may be programmed to transmit the segments of the audio signal corresponding to the speech of speakers 160, 162, 163 and/or transcriptions of the segments to, for example, device 2160. Processor 540 of device 2160 may be programmed to display the transcriptions corresponding to the speech of speakers 160, 162, 163 in user interface 2164 as illustrated in FIG. 22B.

In some embodiments, the second processor may be programmed to display at least one of a transcription of the audio signal, an identity of a speaker associated with the transcription, a date of capturing the audio signal, or a time of capturing the audio signal. As discussed above, in some embodiments, processor 210 of wearable apparatus 110 may be programmed to recognize one or more individuals associated with one or more segments of the audio signal captured by audio sensor 220. Processor 210 may also be programmed to transmit the one or more segments of the audio signal in association with their respective identities to a computing platform (e.g., secondary computing device 120, device 2160, etc.). It is contemplated that in some embodiments, processor 540 of device 2160 may display the identity associated with the one or more segments of the audio signal together with the transcribed text corresponding to those segments in user interface 2164. For example, as illustrated in FIG. 22B, processor 540 may display identities 2270, 2272, 2274 (e.g., speaker 160, speaker 162, speaker 164, respectively) associated with the transcribed text 2250, 2252, 2254, respectively. It is also contemplated that in some embodiments, processor 210 of wearable apparatus 110 may transmit to device 2160 other information such as a date or a time at which audio sensor 1710 may have captured the audio signal, or the one or more segments of the audio signal corresponding to speech by, for example, speakers 160, 162, 163, etc. In these exemplary embodiments, processor 540 of device 2160 may also be programmed to display the date and/or time associated with the one or more speakers 160, 162, 163, etc., in user interface 2164. For example, as illustrated in FIG. 22B, processor 540 may be programmed to display date 2280 (e.g., Jul. 13, 2021) and or time 2282 (11:54 AM) associated with transcribed text corresponding to the speech of, for example, speaker 163.

In some embodiments, the computing platform may be a remote server that may be programmed to transmit at least one of the plurality of images, the at least one segment of the audio signal, or the additional data to the secondary device. In the above disclosure, processor 210 of wearable apparatus 110 has been described as being programmed to transmit one or more segments of the audio signal, a transcription of at least one segment of the audio signal, an image, or one or more items of other information to computing device 120 or device 2160. It is contemplated, however, that in some embodiments, the computing platform may be a remote server (e.g., server 250). Thus, processor 210 of wearable apparatus 110 may additionally or alternatively be programmed to transmit one or more segments of the audio signal, a transcription of at least one segment of the audio signal, an image, or one or more items of other information to, for example, server 250. It is further contemplated that one or more of the functions performed by processor 210 of wearable apparatus 110 (e.g., identifying segments of audio signal comprising speech, determining identity of a speaker associated with one or more segments of the audio signal, determining identity of an individual in an image, transcribing one or more segments into text, etc.) may additionally or alternatively be performed by processor 540 that may be associated with server 250. It is also contemplated that processor 540 of server 250 may be programmed to transmit one or more segments of the audio signal, a transcription of at least one segment of the audio signal, an image, or one or more items of other information received from wearable apparatus 110 to a secondary computing device (e.g., computing device 120 or device 2160).

Figure 23:
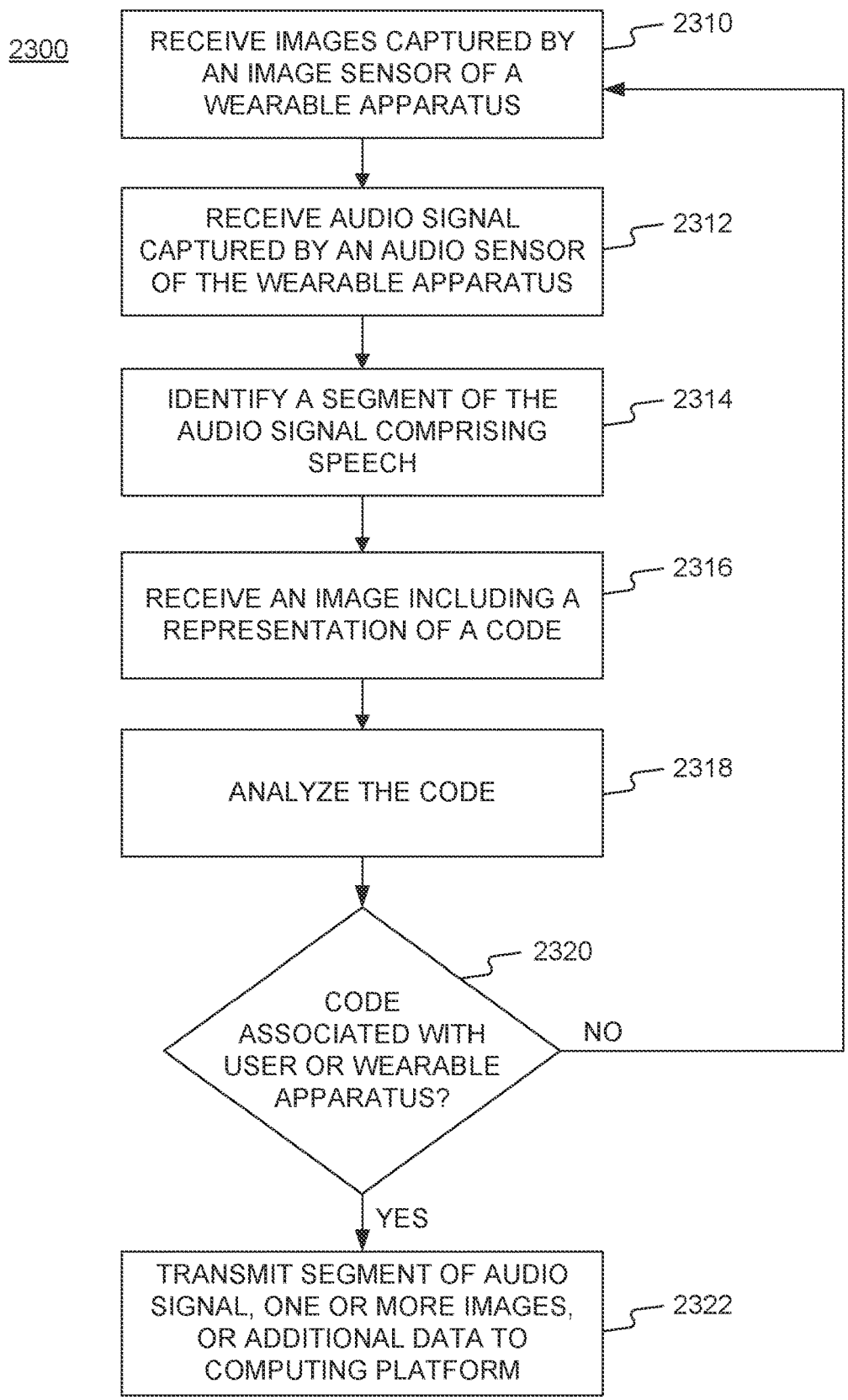
FIG. 23 is a flowchart showing an example process for processing audio signals, consistent with the present disclosure.

FIG. 23 is a flowchart showing an exemplary process 2300 for automatically providing a transcription or summary associated with an interaction of user 100 with other individuals (e.g., individuals 1820 or 1830) in environment 1800 of user 100. Process 2300 may be performed by one or more processors associated with apparatus 110, such as processor 210.

In step 2310, process 2300 may include receiving one or more images from an environment of a user. For example, apparatus 110 may capture one or more images from an environment of a user using image sensor 220, which may be part of a camera included in apparatus 110. The camera may include one or more cameras (including one or more image sensors 220) configured to capture one or more images from the surrounding environment of user 100 and output one or more image signals, as discussed above.

In step 2312, process 2300 may include receiving at least one audio signal representative of the sounds captured by an audio sensor from an environment of a user. For example, apparatus 110 may receive audio signals representative of sounds 1821, 1831, 1840, 1850, etc., captured by audio sensor 1710. Audio sensor 1710 may be embodied in, for example, one or more microphones 443, 444 that may comprise one or more directional microphones, a microphone array, a multi-port microphone, or the like.

In step 2314, process 2300 may include identifying at least one segment of the audio signal, the at least one segment comprising speech. For example, processor 210 may be programmed to execute instructions embodied in, for example voice recognition component 1941 to identify segments of the audio signal comprising speech. Processor 210 may employ one or more voice recognition algorithms, audio signal characteristics, machine learning algorithms, or neural networks to recognize voices in and/or identify the segments of the audio signal associated with speech. It is also contemplated that processor 210 may analyze both the audio signal received from audio sensor 1710 and images received from image sensor 220 (e.g., by recognizing faces, tracking lips, etc.) to identify segments of the audio signal comprising speech by one or more individuals in the environment of user 100.

In step 2316, process 2300 may include receiving an image captured by the image sensor, the image including a representation of a code. For example, as discussed above, image sensor 220 associated with apparatus 110 may capture an image including a representation of one or more of a QR code 2020, a barcode 2040, and alphanumeric or 2060, or the like.

In step 2318, process 2300 may include analyzing the code. For example, processor 210 of wearable apparatus 110 may be programmed to execute one or more image processing algorithms (e.g., ZXing) to determine whether the image includes QR code 2020 or barcode 2040. Processor 210 may also execute one or more algorithms such as ZXing to extract the information stored in QR code 2020 and/or barcode 2040. Alternatively, processor 210 may be programmed to execute one or more optical character recognition algorithms to extract, for example, alphanumeric code 2060 from image 2050. Processor 210 may also be programmed to determine whether one or more items of information extracted from, for example, QR code 2020 and/or barcode 2040, or the alphanumeric code 2060 extracted from image 2050 is associated with user 100 and/or an application or program being executed by wearable apparatus 110.

In step 2320, process 2300 may include determining whether the code is associated with at least one of the user or a wearable apparatus associated with the user. For example, processor 210 may be programmed to determine identifying information used to execute a program of application on computing device 120 and determine whether that identifying information matches the information extracted from QR code 2020, barcode 2040, or alphanumeric code 2060. In some embodiments, processor 210 may be programmed to identify information associated with a program or an application being executed by processor 210 on wearable apparatus 110. Processor 210 may also be programmed to compare the identified information with one or more items of identifying information extracted from, for example QR code 2020, barcode 2040, or alphanumeric code 2060 to determine whether the code is associated with the wearable apparatus 110.

When processor 210 determines that the QR code 2020, barcode 2040, or alphanumeric code 2060 is not associated with user 100 or with wearable apparatus 110 (Step 2320: NO), process 2300 may return to step 2310. Although FIG. 23 illustrates that process 2300 returns to step 2310, it is contemplated that in various embodiments, process 2300 may instead return to any of steps 2310-2318 of process 2300.

When processor 210 determines that QR code 2020, barcode 2040, or alphanumeric code 2060 is associated with user 100 or with wearable apparatus 110 (Step 2320: YES), process 2300 may proceed to step 2322 that may include transmitting at least one of a transcription of the at least one segment of the audio signal, at least one of the plurality of images, or information to a computing platform. For example, processor 210 may be programmed to transmit segments of the audio signal received by processor 210 from audio sensor 1710, one or more images captured by image sensor 220, one or more prestored images, and/or one or more items of other information to a computing platform. In some embodiments, the computing platform may be another computing device such as computing device 120 or device 2160. In other exemplary embodiments, the computing platform may be a remote server (e.g., server 250).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus, comprising:
   an image sensor configured to capture a plurality of images from an environment of a user of the wearable apparatus;
   an audio sensor configured to capture an audio signal from the environment of the user; and
   at least one processor programmed to:
      receive the audio signal captured by the audio sensor;
      identify at least one segment of the audio signal, the at least one segment comprising speech;
      receive an image captured by the image sensor, the image including a representation of a code;
      analyze the code to determine whether the code is associated with at least one of the user or the wearable apparatus; and
      after determining that the code is associated with the user or the wearable apparatus, transmit at least one of: the at least one segment of the audio signal, at least one image of the plurality of images, or other information to a computing platform.

2. The wearable apparatus of claim 1, wherein the code is one of a QR code, a barcode, or an alphanumeric code.

3. The wearable apparatus of claim 1, wherein the at least one processor is programmed to determine whether the code is associated with the user by determining whether a program or an application executed by the computing platform is associated with the user.

4. The wearable apparatus of claim 1, wherein the processor is programmed to determine whether the code is associated with the wearable apparatus by determining whether the code is associated with a program or an application associated with the wearable apparatus.

5. The wearable apparatus of claim 1, wherein the at least one processor is further programmed to:
   transcribe at least one portion of the audio signal into text;
   include the transcribed text in the other information; and
   transmit the other information to the computing platform.

6. The wearable apparatus of claim 5, wherein the at least one processor is further programmed to:
   determine an identity of an individual associated with the at least one segment of the audio signal; and
   include the determined identity in association with the transcribed text in the other information.

7. The wearable apparatus of claim 1, wherein the at least one processor is further programmed to:
   determine an identity of an individual based on at least one image of the plurality of images;
   include the identity of the individual in association with the at least one image in the other information; and
   transmit the other information to the computing platform.

8. The wearable apparatus of claim 1, wherein the at least one processor is programmed to derive the other information based on the audio signal, the at least one image, or both.

9. A system for processing audio signals, the system comprising:
   an image sensor configured to capture a plurality of images from an environment of a user;
   an audio sensor configured to capture an audio signal from the environment of the user;
   a first processor programmed to:
      receive the audio signal captured by the audio sensor;
      identify at least one segment of the audio signal, the at least one segment comprising speech;
      receive an image captured by the image sensor, the image including a representation of a code;
      analyze the code to determine whether the code is associated with at least one of the user or a device associated with the first processor; and
      after determining that the code is associated with the user or the device associated with the first processor, transmit at least one of a transcription of the at least one segment of the audio signal, at least one image of the plurality of images, or other information to a computing platform; and
   a second processor programmed to:
      display the image representing the code on a display device, wherein the display device is located in the environment of the user.

10. The system of claim 9, wherein the code includes a link, and the first processor is programmed to access the link to receive information about the user.

11. The system of claim 9, wherein the second processor is programmed to display at least a portion of at least one of the plurality of images or the information on the display device.

12. The system of claim 9, wherein the second processor is further programmed to:
    display an icon on the display device, wherein the icon is associated with the at least one segment of the audio signal;
    receive an input comprising a selection of the icon; and
    after receiving the input, play the at least one segment of the audio signal.

13. The system of claim 9, wherein
    the image sensor, the audio sensor, and the first processor are included in a wearable apparatus, and
    the second processor is included in a secondary device.

14. The system of claim 13, wherein the secondary device is the computing platform.

15. The system of claim 14, wherein
    the first processor is programmed to transcribe at least a portion of the audio signal into text; and
    the second processor is programmed to display the transcribed text on the display device.

16. The system of claim 14, wherein the second processor is programmed to:
- transcribe at least a portion of the audio signal into text; and
- display the transcribed text on the display device.

17. The system of claim 16, wherein the second processor is further programmed to provide the transcribed text to a predetermined application or program being executed by the second processor.

18. The system of claim 14, wherein the second processor is programmed to display at least one image of the plurality of images and an identity of at least one individual associated with the at least one image on the display device.

19. The system of claim 14, wherein the second processor is programmed to display at least one of a transcription of the audio signal, an identity of a speaker associated with the transcription, a date of capturing the audio signal, or a time of capturing the audio signal.

20. The system of claim 13, wherein the computing platform is a remote server programmed to transmit at least one of the plurality of images, the at least one segment of the audio signal, or the other information to the secondary device.

21. A method for processing audio signals, the method comprising:
- receiving at least one audio signal representative of the sounds captured by an audio sensor from an environment of a user;
- identifying at least one segment of the audio signal, the at least one segment comprising speech;
- receiving an image captured by the image sensor, the image including a representation of a code;
- analyzing the code to determine whether the code is associated with at least one of the user or a wearable apparatus associated with the user; and
- after determining that the code is associated with the user or the wearable apparatus, transmitting at least one of a transcription of the at least one segment of the audio signal, at least one of the plurality of images, or other information to a computing platform.

22. A non-transitory computer-readable medium including instructions which when executed by at least one processor performs a method, the method comprising:
- receiving at least one audio signal representative of the sounds captured by an audio sensor from an environment of a user;
- identifying at least one segment of the audio signal, the at least one segment comprising speech;
- receiving an image captured by the image sensor, the image including a representation of a code;
- analyzing the code to determine whether the code is associated with at least one of the user or a wearable apparatus associated with the user; and
- after determining that the code is associated with the user or the wearable apparatus, transmitting at least one of a transcription of the at least one segment of the audio signal, at least one of the plurality of images, or other information to a computing platform.

* * * * *